(12) United States Patent
Hötzel et al.

(10) Patent No.: US 10,987,997 B2
(45) Date of Patent: Apr. 27, 2021

(54) AIR CONDITIONING SYSTEM OF A MOTOR VEHICLE AND METHOD FOR OPERATING THE AIR CONDITIONING SYSTEM

(71) Applicant: Hanon Systems, Daejeon (KR)

(72) Inventors: Martin Hötzel, Ratingen (DE); Navid Durrani, Kerpen (DE); Christoph Bara, Cologne (DE)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 16/687,757

(22) Filed: Nov. 19, 2019

(65) Prior Publication Data
US 2020/0164720 A1 May 28, 2020

(30) Foreign Application Priority Data

Nov. 22, 2018 (DE) .......................... 102018129393.3

(51) Int. Cl.
*B60H 1/00* (2006.01)
*B60H 1/32* (2006.01)

(52) U.S. Cl.
CPC ..... *B60H 1/00914* (2013.01); *B60H 1/00885* (2013.01); *B60H 1/3205* (2013.01); *B60H 2001/00949* (2013.01)

(58) Field of Classification Search
CPC ............ B60H 1/00885; B60H 1/00914; B60H 1/3205; B60H 2001/00949
See application file for complete search history.

(56) References Cited

U.S. PATENT DOCUMENTS

2015/0308709 A1* 10/2015 Rahimi ................. F24F 13/222
165/56
2015/0308719 A1  10/2015 Gebbie et al.
(Continued)

FOREIGN PATENT DOCUMENTS

DE      102009060860 A1     7/2011
DE      102010060468 A1     5/2012
(Continued)

*Primary Examiner* — Marc E Norman
(74) *Attorney, Agent, or Firm* — Shumaker, Loop & Kendrick, LLP; James D. Miller

(57) ABSTRACT

A climate control system of a motor vehicle having a refrigeration circuit and a coolant circuit. The refrigeration circuit includes a compressor, a refrigerant-coolant heat exchanger operable as a condenser/gas cooler for heat exchange between the refrigerant and the coolant of the coolant circuit, and at least one first refrigerant-air heat exchanger for conditioning intake air for the passenger compartment having a first expansion element upstream in a flow direction of the refrigerant. The coolant circuit includes a conveyor device, a first coolant-air heat exchanger heating the intake air for the passenger compartment, and the refrigerant-coolant heat exchanger. A refrigerant-air heat exchanger for exchanging heat between the refrigerant and ambient air is provided. The refrigerant-air heat exchanger is arranged downstream of the first refrigerant-coolant heat exchanger in the flow direction of the refrigerant. An expansion element is upstream of the refrigerant-air heat exchanger in the flow direction of the refrigerant.

21 Claims, 12 Drawing Sheets

(56) References Cited

U.S. PATENT DOCUMENTS

| | | | | |
|---|---|---|---|---|
| 2016/0018153 A1* | 1/2016 | Ragazzi | ............ | B60H 1/00392 |
| | | | | 62/324.1 |
| 2017/0240024 A1* | 8/2017 | Blatchley | ........... | B60H 1/00921 |
| 2018/0319254 A1* | 11/2018 | Hotzel | ............... | B60H 1/32281 |
| 2019/0061471 A1* | 2/2019 | Hotzel | ............... | B60H 1/00921 |

FOREIGN PATENT DOCUMENTS

| | | |
|---|---|---|
| DE | 102012111672 A1 | 10/2013 |
| DE | 102012108891 A1 | 3/2014 |
| DE | 112013003304 T5 | 4/2015 |
| DE | 102016111599 A1 | 1/2017 |
| DE | 102017109309 A1 | 11/2018 |
| JP | H08295117 A | 11/1996 |
| JP | H10100662 A | 4/1998 |
| KR | 20170011967 A | 2/2017 |

\* cited by examiner

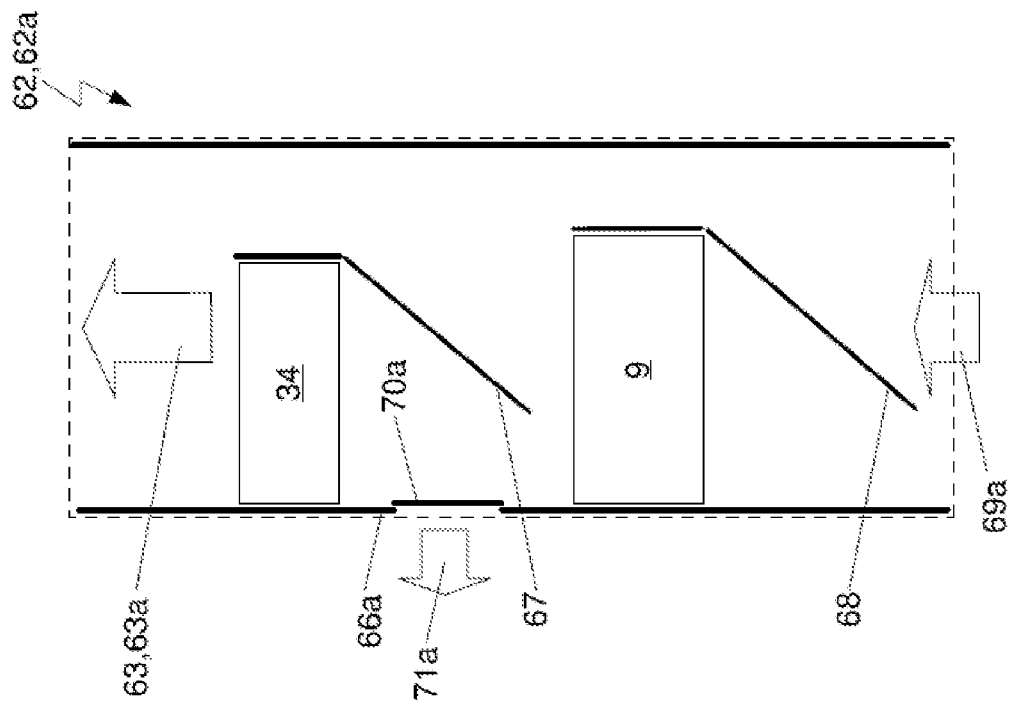
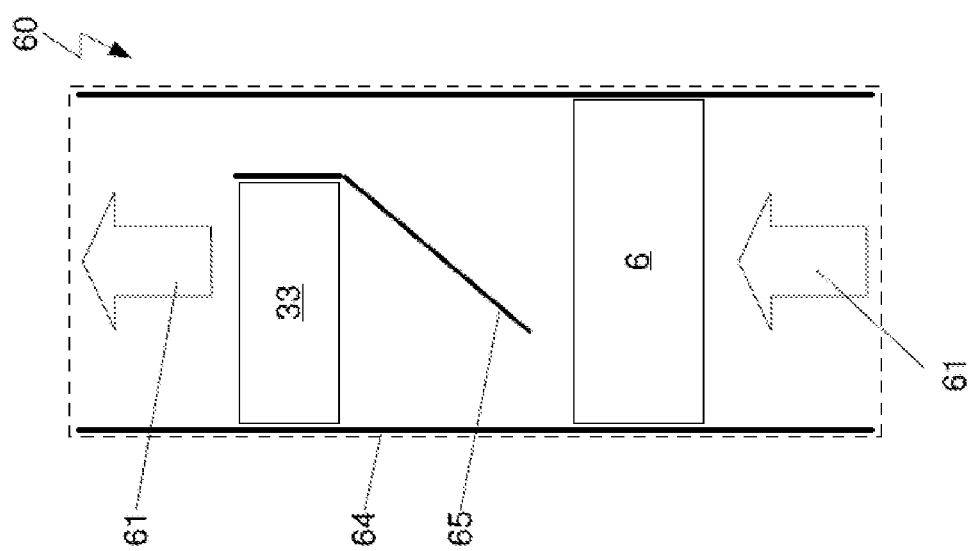

AIR CONDITIONING SYSTEM OF A MOTOR VEHICLE AND METHOD FOR OPERATING THE AIR CONDITIONING SYSTEM

CROSS-REFERENCE TO RELATED PATENT APPLICATIONS

The present patent application claims the benefit of German Patent Application No. DE 102018129393.3 filed Nov. 22, 2018, the contents of which are hereby incorporated herein by reference in their entirety.

TECHNICAL FIELD

The invention relates to a climate control system for conditioning the air of a passenger compartment of a motor vehicle having a refrigeration circuit and a coolant circuit. The refrigeration circuit comprises a compressor, a refrigerant-coolant heat exchanger operable as a condenser/gas cooler for heat exchange between the refrigerant and the coolant of the coolant circuit, and at least one coolant-air heat exchanger for conditioning the intake air for the passenger compartment having an expansion element upstream in the flow direction of the refrigerant. The coolant circuit is formed having a conveyor device for circulating the coolant, at least one coolant-air heat exchanger for heating the intake air for the passenger compartment, and the refrigerant-coolant heat exchanger.

Furthermore, the invention relates to a method for operating the climate control system.

BACKGROUND

In motor vehicles known from the prior art, the waste heat of the engine is used for heating the intake air for the passenger compartment. The waste heat is transported to the climate control system by means of the coolant circulated in the engine coolant circuit and transferred there via the heating heat exchanger to the air flowing into the passenger compartment. Known systems having coolant-air heat exchangers, which acquire the heating power from the coolant circuit of a high-efficiency internal combustion engine of the vehicle drive, at low ambient temperatures, no longer reach the level required for comfortable heating of the passenger compartment in order to cover the total heating requirement of the passenger compartment. The drives do not generate enough waste heat to heat the passenger compartment, in particular in winter, in accordance with the requirements of thermal comfort. This applies similarly to systems in motor vehicles having hybrid drive, i.e., motor vehicles driven both by electric motors and also internal combustion engines.

If the total heating requirement of the passenger compartment cannot be covered by means of the heat from the engine coolant circuit, auxiliary heating measures are required, such as electrical resistor heaters, abbreviated as PTC resistor for "positive temperature coefficient—thermistor", or fuel heaters. This also applies to systems in motor vehicles driven solely by electric motors and/or fuel cell vehicles.

A climate control system 1' having a refrigeration circuit 2' and a coolant circuit 30' from the prior art is shown in FIG. 1. The refrigeration circuit 2' comprises, in the flow direction of the refrigerant, a compressor 3, a refrigerant-coolant heat exchanger 4 operated as a condenser/gas cooler, an expansion element 5, and a refrigerant-air heat exchanger 6 operated as an evaporator. The compressor 3 suctions the refrigerant out of the evaporator 6. The refrigeration circuit 2' is closed.

If the refrigerant is liquefied in subcritical operation of the refrigeration circuit, for example, using the refrigerant R134a or in specific environmental conditions using carbon dioxide, the heat exchanger is referred to as a condenser. A part of the heat exchange takes place at constant temperature. In supercritical operation and/or with supercritical heat emission into the heat exchanger, the temperature of the refrigerant decreases continuously. In this case, the heat exchanger is also referred to as a gas cooler. Supercritical operation can occur under certain ambient conditions or operating modes of the refrigeration circuit, for example, using the refrigerant carbon dioxide.

The refrigeration circuit 2' can also be formed having an internal heat exchanger 7. The internal heat exchanger 7 is to be understood as a circuit-internal heat exchanger, which is used for the heat exchange between the refrigerant at high pressure and the refrigerant at low pressure. In this case, for example, on the one hand, the liquid refrigerant is cooled down further after the condensation and/or liquefaction and, on the other hand, the suction gas is superheated before the compressor 3.

The coolant circuit 30' comprises, in the flow direction of the coolant, a conveyor device 31 for circulating the coolant, in particular a pump, an auxiliary heating heat exchanger 32 for heating the coolant, especially an electrical resistance heater (PTC), and a heating heat exchanger 33 as a coolant-air heat exchanger for heating the intake air for the passenger compartment. The heating heat exchanger 33 is connected to the refrigerant-coolant heat exchanger 4. The coolant circuit 30' is closed. The refrigerant-coolant heat exchanger 4 operated on the refrigerant side as a condenser/gas cooler is therefore coolant cooled.

The refrigerant-air heat exchanger 6, which is operated as an evaporator, of the refrigeration circuit 2' and the heating heat exchanger 33 of the coolant circuit 30' are arranged inside a component 60 of a climate control system so that the intake air of the passenger compartment can be applied to them in succession and in the flow direction 61 of air. The intake air which is cooled and/or dehumidified upon flowing over the evaporator 6 can thus be heated as needed as it flows over the heating heat exchanger 33.

Heat transferable in the heating heat exchanger 33 to the intake air of the passenger compartment can be composed of the energies transferred to the refrigerant in the evaporator 6 and in the compressor 3, which are transferred as a total in the refrigerant-coolant heat exchanger 4 to the coolant, and also the heat transferred to the coolant in the auxiliary heating heat exchanger 32, in order to reach a satisfactory temperature of the intake air.

In conventional climate control systems (not shown) having a refrigeration circuit having a condenser/gas cooler designed as a refrigerant-air heat exchanger, the heat absorbed by the refrigerant in the evaporator during the operation in the refrigeration mode during the cooling and dehumidifying of the intake air for the passenger compartment is transferred jointly with the heat supplied in the compressor via the refrigerant-air heat exchanger arranged in the front region of the vehicle from the refrigerant to the ambient air.

The climate control system 1' can exclusively be operated at temperatures of the intake air flowing into the evaporator 6 having values above 0° C. At values of the temperature of the air below 0° C., the heating power is determined by the auxiliary heating heat exchanger 32, in particular the electrical resistance heater, and is thus provided inefficiently.

At temperatures of the air in the range of 0° C. and below 0° C., the heat exchange surface of the evaporator 6 can ice over. As a result of the absorption of the heat from the air, the relative ambient humidity of the cooled air rises. Upon falling below the dew point temperature, the water vapor present in the air is condensed out and deposited as water on the heat exchange surface. The water condensed out of the air on the heat exchange surface will solidify to form ice at surface temperatures in the range of 0° C. and below 0° C. The increasing ice layer reduces the air-side heat exchange surface and the air-side heat transfer and thus the heat exchange between the air and the evaporating refrigerant.

A heat absorption from the surroundings, for example, during operation in the heat pump mode, is not possible. The heat from the air flowing out of the passenger compartment also cannot be used.

For motor vehicles having autonomous vehicle control, also referred to as autonomous vehicles, the comfort demand is moreover displaced from the front seats toward seats in further possible seating rows, which significantly increases the need for comfort of the passenger seats. A further heat exchanger operated as an evaporator, which is integrated into the air conditioner for elevated comfort in the passenger compartment, and is also referred to as a tail evaporator, is conventionally operated because of the system at the same pressure level and thus at the same temperature level as the front evaporator or main evaporator and can easily ice over at lower fan power and simultaneously high power of the front evaporator.

Moreover, the tail evaporator, in particular during operation at high external temperatures, usually suctions air out of the passenger compartment, so that a significant power difference can result between the front evaporator, which suctions fresh air out of the surroundings, and the tail evaporator, which suctions recirculated air from the passenger compartment, which in turn significantly increases the risk of icing over. To avoid the icing over of the heat exchange surfaces, the power of the compressor is typically reduced, which decreases the overall cooling power of the system.

A more efficient option for heating the air for the passenger compartment is a heat pump using air as a heat source, in which the refrigeration circuit is used both as the only heater and also as an auxiliary measure.

A climate control system having electrical resistance heater connected downstream is, on the one hand, cost-effective to produce and is to be used in arbitrary motor vehicles, but has a very high demand for electrical energy, since the intake air for the passenger compartment firstly has to be cooled and/or dehumidified as it flows over an evaporator of a refrigeration circuit and also subsequently heated by means of the electrical resistance heater, which transfers the heat directly to the intake air or a coolant circuit.

The operation of a conventional climate control system to be operated as a heat pump is efficient, but requires a very large amount of installation space, also at positions inside the motor vehicle which do not have installation space reserved for the climate control. The elevated cost expenditure, in particular for the production and maintenance, and the large installation space requirement are detrimental.

The prior art includes air-air heat pumps, which are designed for the combined refrigeration mode and heat pump mode, i.e., for a heating mode and for a reheating mode, also referred to as "reheat" operation, and absorb the heat from the ambient air. The ambient air is thus used as a heat source for the evaporation of the refrigerant. The conventional air-air heat pumps comprise a heat exchanger for the heat exchange between the refrigerant and the surroundings, a heat exchanger for the heat supply from the air of the passenger compartment to be conditioned to the refrigerant, and a heat exchanger for the heat exchange from the refrigerant to the air to be conditioned for the passenger compartment. The powers are transferred in each case between the refrigerant and air.

In the so-called "reheat" or reheating mode, the air to be supplied to the passenger compartment is cooled, dehumidified at the same time, and subsequently slightly heated again. In this operating mode, the required reheating power is less than the required refrigeration power for cooling and dehumidifying the air.

A refrigeration circuit of a climate control system for conditioning the air of a passenger compartment of a motor vehicle is disclosed in DE 10 2012 111 672 A1. The refrigeration circuit is designed for a combined operation in the refrigeration mode and heat pump mode and for a reheating mode and comprises a compressor, a heat exchanger for the heat exchange between the refrigerant and the surroundings, a first expansion element, and a heat exchanger for the heat supply from the air of the passenger compartment to be conditioned to the refrigerant, a heat exchanger for the heat exchange from the refrigerant to the air for the passenger compartment to be conditioned, and a second expansion element adjoining thereon in the flow direction of the refrigerant.

The refrigeration circuit comprises a branched system of connecting lines, which can only be integrated with difficulty into the existing installation space. Furthermore, the additional valves and the refrigerant accumulator, which is voluminously designed and arranged at a low pressure level, each require a large amount of installation space. The valves moreover have to have a very high level of internal leak-tightness, which also results in elevated system costs.

The utilization of the waste heat from the passenger compartment is very limited. Moreover, refrigerant flows through heat exchangers bidirectionally, the compressor has to be switched off to switch over between the different operating modes and the valves have to be switched. The climate control system cannot use waste heat of the passenger compartment for heating the passenger compartment. The warm air of the passenger compartment is discharged into the surroundings.

A climate control system for conditioning the air of a passenger compartment, comprising a housing having two flow channels for conducting air and a refrigeration circuit having an evaporator and a condenser, is described in DE 10 2012 108 891 A1. In this case, the evaporator is arranged in the first flow channel and the condenser is arranged in the second flow channel. The climate control system is designed for cooling and heating the passenger compartment and for a reheating mode. The setting of the operating mode is performed solely via the control of air guiding units, so that refrigerant switching valves for switching over between different operating modes can be omitted.

Independently of the respective operating mode, a fan is to be provided in each case for the evaporator side and the condenser side of the climate control system and thus two separately operable fans. In this case, for example, during the operation in the refrigeration mode, the energy of the travel wind on the condenser side cannot be used for the heat emission. The associated fan is always in the operating state, which can result in vibrations and noises. Moreover, it is necessary to reserve installation space at positions inside the motor vehicle which do not have installation space reserved for the climate control.

The climate control system can use waste heat of the passenger compartment for heating the passenger compartment, however, a reconfiguration of the flow paths for the intake air and the exhaust air of the passenger compartment is very complex in existing motor vehicles.

If waste heat, for example, from a coolant circuit, is also to be usable simultaneously for the climate control systems known from DE 10 2012 111 672 A1 or DE 10 2012 108 891 A1, a further heat exchanger operable as an evaporator for the refrigerant, especially a plate evaporator, having an additional expansion element, in particular an expansion valve, is thus additionally to be provided in each case. In this case, during operation in the refrigeration mode, however, refrigerant at the same pressure level is applied to both the refrigerant-air heat exchanger operated as an evaporator and also the additional plate evaporator of the coolant circuit. The two different energy flows of the air and the coolant have to have the same temperature level to be able to operate the refrigeration circuit efficiently. However, since the temperature of the air in the passenger compartment is only slowly heated, the operation of the evaporator at the same pressure level is only conceivable in rare cases and solely inside a short duration. The different refrigerant-air heat exchangers and plate heat exchangers operated as evaporators could only be operated at the same pressure level during the operation of the refrigeration circuit in the heat pump mode.

SUMMARY

The object of the invention is now to provide a climate control system for a motor vehicle, which can be operated in the refrigeration mode, in the heat pump mode, and also in the reheating mode. In this case, waste heat of different heat sources, for example, waste heat of the passenger compartment, or heat of the ambient air, at corresponding temperature levels, is to be able to be coupled efficiently into the refrigeration circuit in particular during operation in the heat pump mode or in the reheating mode, also to cover an elevated heating demand, for example, of large passenger automobiles or utility vehicles for passenger transport. The ambient air is also to be used as a heat sink for the operation of the climate control system in the refrigeration mode, to similarly provide an elevated cooling demand, in particular again in the case of large passenger automobiles or utility vehicles for passenger transport. Furthermore, powers of heat exchangers operated as evaporators are to be variably controllable in order to avoid possible icing over of the heat exchange surfaces independently of the respective operating mode. The climate control system is thus to be efficiently operable, in particular with minimal risk of icing over of the evaporator of the refrigeration circuit for heat exchange with air, and embodied compactly. The refrigeration circuit of the climate control system is to be constructed in a simple design in this case and is to comprise a minimum required number of components in order to cause only minimal operating costs, production costs, and maintenance costs and to have a minimal installation space requirement.

Moreover, one object of the invention is to provide a method for operating the climate control system, using which in particular the ambient air is efficiently usable as needed as a heat source or heat sink at corresponding temperature levels.

The object is achieved by the subject matter and/or the method having the features of the independent patent claims. Refinements are specified in the dependent patent claims The object is achieved by a climate control system according to the invention for conditioning the air of a passenger compartment of a motor vehicle, in particular for an operation in a refrigeration mode, in a heat pump mode, and in a reheating mode, having a refrigeration circuit and a coolant circuit. The refrigeration circuit comprises, in the flow direction of the refrigerant, a compressor, a first refrigerant-coolant heat exchanger operable as a condenser/gas cooler for the heat exchange between the refrigerant and the coolant of the coolant circuit, and also at least one first refrigerant-air heat exchanger for conditioning the intake air for the passenger compartment having a first expansion element arranged upstream in the flow direction of the refrigerant. The coolant circuit is formed having a first conveyor device for circulating the coolant, at least one first coolant-air heat exchanger for heating the intake air for the passenger compartment, and the first refrigerant-coolant heat exchanger.

The refrigeration mode is used above all for cooling, the heat pump mode for heating, and the reheating mode for reheating the intake air of the passenger compartment to be conditioned. In the reheating mode, the intake air was cooled and/or dehumidified before the reheating.

According to the concept of the invention, the refrigeration circuit is formed having a refrigerant-air heat exchanger for exchanging heat between the refrigerant and ambient air. The refrigerant-air heat exchanger is arranged downstream in the flow direction of the refrigerant of the first refrigerant-coolant heat exchanger in this case. Moreover, an expansion element is upstream of the refrigerant-air heat exchanger in the flow direction of the refrigerant. The expansion element is therefore provided between the refrigerant-coolant heat exchanger and the refrigerant-air heat exchanger.

According to one advantageous embodiment of the invention, the refrigeration circuit is formed having a second refrigerant-air heat exchanger for conditioning the intake air for the passenger compartment, wherein a second expansion element is upstream of the second refrigerant-air heat exchanger in the flow direction of the refrigerant. The coolant circuit is formed having a second coolant-air heat exchanger for heating the intake air for the passenger compartment.

The first refrigerant-air heat exchanger of the refrigeration circuit and the first coolant-air heat exchanger of the coolant circuit are advantageously arranged so that air can be applied to them inside a first component of a climate control system in succession and in the specified sequence in the flow direction of the intake air for the passenger compartment. The first component of the air conditioner moreover preferably comprises an air guiding unit for allocating and conducting partial air mass flows over a heat exchange surface of the first coolant-air heat exchanger or around the first coolant-air heat exchanger, respectively.

The second refrigerant-air heat exchanger of the refrigeration circuit and the second coolant-air heat exchanger of the coolant circuit are moreover advantageously arranged inside a second component of the air conditioner.

According to one refinement of the invention, the first component of the air conditioner, which is arranged in particular in a front region of the motor vehicle and/or the passenger compartment, is designed so that air exhausted from the passenger compartment or ambient air or a mixture made of air exhausted from the passenger compartment and ambient air can flow through it.

The second component of the air conditioner, which is arranged in particular in a middle or rear region of the passenger compartment, is advantageously designed so that air exhausted from the passenger compartment can flow through it, wherein the air can be discharged into the passenger compartment and/or into the surroundings. Waste heat from the exhaust air of the passenger compartment, for example, during operation of the first component of the air conditioner in the fresh air mode, i.e., during operation using suctioned-in ambient air, and/or in the recirculating mode, i.e., during operation using air exhausted from the passenger compartment, can thus be used.

Moreover, an independent operation of the two components of the air conditioner is always possible, so that the climate control system can also be operated only using the second component, while the first component of the air conditioner is inactive.

According to a first alternative embodiment of the invention, the second refrigerant-air heat exchanger of the refrigeration circuit and the second coolant-air heat exchanger of the coolant circuit are arranged so that the air can be applied to them in succession inside the second component of the air conditioner in the flow direction of the air. The second component of the air conditioner moreover comprises a bypass for conducting air around the refrigerant-air heat exchanger. In this case, the second component of the air conditioner is formed having an air guiding unit for allocating and conducting an air mass flow over a heat exchange surface of the second refrigerant-air heat exchanger and through the bypass around the second refrigerant-air heat exchanger.

According to a second alternative embodiment of the invention, the second component of the air conditioner is formed from two elements arranged separately from one another. In this case, the second coolant-air heat exchanger of the coolant circuit is arranged inside the first element of the second component of the air conditioner and the second refrigerant-air heat exchanger of the refrigeration circuit is arranged inside the second element of the second component of the air conditioner. The elements arranged separately from one another of the second component of the air conditioner preferably each comprise a fan and thus separately operable fans for independently conveying separate air mass flows through the elements.

The second component of the air conditioner moreover advantageously comprises an opening formed in a wall of a housing for discharging air into the surroundings and an air guiding unit for opening and closing the opening. In this case, the opening is arranged downstream of the second refrigerant-air heat exchanger in the flow direction of the air, in the first alternative embodiment of the second component of the air conditioner, formed in particular between the second refrigerant-air heat exchanger and the second coolant-air heat exchanger.

According to one refinement of the invention, the first expansion element and also the first refrigerant-air heat exchanger are arranged inside a first flow path of the refrigeration circuit, while the second expansion element and the second refrigerant-air heat exchanger are arranged inside a second flow path of the refrigeration circuit. Refrigerant can thus flow through the flow paths in parallel.

The refrigeration circuit moreover advantageously comprises a third flow path having a third expansion element and a second refrigerant-coolant heat exchanger operable as an evaporator. The third expansion element is upstream of the second refrigerant-coolant heat exchanger in the flow direction of the refrigerant. In this case, the third flow path is formed in parallel to the first flow path and the second flow path.

The first flow path having the first expansion element and the first refrigerant-air heat exchanger and the second flow path having the second expansion element and the second refrigerant-air heat exchanger are each advantageously formed extending from a diversion point up to a first discharge point.

The third flow path having the third expansion element and the second refrigerant-coolant heat exchanger is preferably formed extending from a diversion point up to a second discharge point. In this case, the second discharge point is arranged downstream of the first discharge point in the flow direction of the refrigerant through the first flow path and through the second flow path.

According to a first alternative embodiment of the invention, a fourth expansion element is arranged downstream of the second refrigerant-air heat exchanger inside the second flow path in the flow direction of the refrigerant.

According to a second alternative embodiment of the invention, an expansion element is arranged downstream of the first discharge point of the first and the second flow path in the flow direction of the refrigerant, wherein the expansion element is preferably arranged between the first discharge point and the second discharge point.

According to a third alternative embodiment of the invention, an expansion element is arranged downstream of each of the first refrigerant-air heat exchanger inside the first flow path and the second refrigerant-air heat exchanger inside the second flow path in the flow direction of the refrigerant.

According to one refinement of the invention, the fifth expansion element arranged upstream of the refrigerant-air heat exchanger for exchanging heat between the refrigerant and ambient air and also the refrigerant-air heat exchanger are arranged inside a fourth flow path of the refrigeration circuit. Moreover, a fifth flow path is provided as a bypass to the fourth flow path having the refrigerant-air heat exchanger, wherein the flow paths each extend between a diversion point and a discharge point.

Exclusively, a shutoff valve is advantageously arranged inside the fifth flow path formed as a bypass to the fourth flow path having the refrigerant-air heat exchanger.

The refrigerant-air heat exchanger can thus be turned off, in particular does not have refrigerant flowing through it, and bypassed if no heat exchange is required between the refrigerant and the ambient air.

The refrigeration circuit moreover preferably comprises an internal heat exchanger.

According to a first alternative embodiment of the invention, the internal heat exchanger is formed inside the first flow path. In this case, the internal heat exchanger is arranged in the flow direction of the refrigerant on the high-pressure side upstream of the first expansion element and on the low-pressure side downstream of the first refrigerant-air heat exchanger.

According to a second alternative embodiment of the invention, the internal heat exchanger is arranged on the high-pressure side between the refrigerant-coolant heat exchanger operable as a condenser/gas cooler for heat exchange between the refrigerant and the coolant of the coolant circuit or between the refrigerant-air heat exchanger for exchanging heat between the refrigerant and ambient air, respectively, in particular between the discharge point of the fourth flow path and the fifth flow path, and the diversion point of the first flow path and the second flow path, and also on the low-pressure side either between the second discharge point of the third flow path and the compressor or between the first discharge point of the first flow path and the second flow path and the second discharge point of the third flow path.

A further advantage of the invention is that the first coolant-air heat exchanger is arranged inside a first flow path of the coolant circuit and the second coolant-air heat exchanger inside a second flow path of the coolant circuit, wherein the flow paths and thus the coolant-air heat exchangers can have coolant flow through them in parallel.

According to an alternative embodiment of the invention, the first coolant-air heat exchanger and the second coolant-air heat exchanger are arranged inside a common flow path of the coolant circuit, so that the coolant-air heat exchangers can have coolant flow through them in series and in succession.

According to one refinement of the invention, the coolant circuit is moreover formed having a third coolant-air heat exchanger for transferring heat to air, in particular to ambient air.

The third coolant-air heat exchanger is advantageously arranged inside a flow path of the coolant circuit, through which coolant can flow in parallel to the flow path formed having the first coolant-air heat exchanger and/or the second coolant-air heat exchanger.

The coolant circuit furthermore preferably comprises a flow path formed as a bypass in parallel to the flow paths having the coolant-air heat exchangers.

Moreover, the coolant circuit is advantageously provided with a flow path which is arranged in parallel to the flow paths having the coolant-air heat exchangers and/or to the flow path formed as a bypass and also comprises a heat exchanger operable as an evaporator and a second conveyor device. The heat exchanger operable as an evaporator is advantageously designed as a refrigerant-coolant heat exchanger.

The flow path formed in parallel to the flow paths having the coolant-air heat exchangers and/or the bypass preferably comprises a further heat exchanger for cooling components of a drivetrain, such as a battery or a motor and/or electrical components. The waste heat of various heat sources thus becomes usable in the coolant circuit.

The object of the invention is also achieved by a method according to the invention for operating a climate control system of a motor vehicle having a refrigeration circuit and a coolant circuit for an operation in a refrigeration mode, in a heat pump mode, and in a reheating mode for the intake air of the passenger compartment to be conditioned.

According to the concept of the invention, the pressure level of the refrigerant inside a refrigerant-air heat exchanger for transferring heat between the refrigerant and ambient air is set continuously using an expansion element arranged upstream of the refrigerant-air heat exchanger in the flow direction of the refrigerant, depending on the operating mode, between a high pressure level and a low pressure level of the refrigeration circuit—including high pressure level and low pressure level. In this case, the refrigerant-air heat exchanger is operated at a temperature level of the refrigerant corresponding to the pressure level above the temperature of the ambient air as a condenser/gas cooler and also heat is transferred from the refrigerant to the ambient air. At a temperature level of the refrigerant corresponding to the pressure level below the temperature of the ambient air, the refrigerant-air heat exchanger is operated as an evaporator and heat is transferred from the ambient air to the refrigerant.

In this case, the climate control systems can be operated smoothly and uniformly even when switching over between the operating modes.

According to one advantageous embodiment of the invention, the pressure levels of the refrigerant are set in such a way that the pressure level inside a first refrigerant-air heat exchanger for conditioning the intake air for the passenger compartment and also the pressure level inside a second refrigerant-air heat exchanger for conditioning the intake air for the passenger compartment correspond to one another or deviate from one another. Moreover, at least one pressure level inside the first refrigerant-air heat exchanger and/or inside the second refrigerant-air heat exchanger preferably corresponds to the pressure level inside a refrigerant-coolant heat exchanger operable as an evaporator or is higher than the pressure level inside the refrigerant-coolant heat exchanger operable as an evaporator.

According to one refinement of the invention, refrigerant flows through the first refrigerant-air heat exchanger and the second refrigerant-air heat exchanger of the refrigeration circuit in parallel. The further refrigerant-coolant heat exchanger operable as an evaporator in turn advantageously has refrigerant applied thereto in parallel to the first refrigerant-air heat exchanger and/or the second refrigerant-air heat exchanger.

According to one preferred embodiment of the invention, coolant flows through a first coolant-air heat exchanger and a second coolant-air heat exchanger of the coolant circuit in parallel to one another or in series in succession.

In a flow direction of the air, preferably air is applied to the first refrigerant-air heat exchanger and subsequently the first coolant-air heat exchanger inside a first component of an air conditioner, wherein at least one partial air mass flow is conducted over a heat exchange surface of the first coolant-air heat exchanger.

Moreover, in a flow direction of the air inside a second component of the air conditioner, air is applied to the second refrigerant-air heat exchanger and subsequently the second coolant-air heat exchanger, wherein in each case at least one partial air mass flow is conducted over a heat exchange surface of the second refrigerant-air heat exchanger and over a heat exchange surface of the second coolant-air heat exchanger and/or at least one partial air mass flow of an air mass flow conducted over a heat exchange surface of the second refrigerant-air heat exchanger or past the second refrigerant-air heat exchanger is discharged into the surroundings.

The climate control system according to the invention and/or the method for operating the climate control system comprise diverse advantages in summary:
  climate control, in particular cooling, dehumidifying, and/or heating of the intake air of the passenger compartment with minimal usage of energy, also by utilizing all waste heat and heat loss flows for heating the passenger compartment to different temperature levels without power limiting in the case of high refrigeration demand or heating demand, also by
  on demand and continuous regulation of the pressure of the refrigerant in the ambient heat exchanger, through which refrigerant flows unidirectionally, and also
  unobtrusive switching between the operating modes,
  minimal risk of icing over of the heat exchange surface,
  enhanced performance, efficiency, and service life also due to permanent operation without load jumps and also providing an adequate and elevated level of comfort inside the passenger compartment with locally strongly reduced air speeds using a simply designed refrigeration circuit made of mass-produced components without changes, which can be integrated for use in known schemes and provided installation spaces of existing motor vehicles and has a minimal installation space, a minimal weight, and a minimal number of components, and thus minimal operating costs, production costs, and maintenance costs.

BRIEF DESCRIPTION OF THE DRAWINGS

Further details, features, and advantages of embodiments of the invention result from the following description of exemplary embodiments with reference to the associated drawings. In the figures:

FIG. 3: shows a first component of an air conditioner for conditioning the intake air for a front region of the passenger compartment;

FIG. 4: shows a first embodiment of a second component of an air conditioner for conditioning the intake air for a middle or rear region of the passenger compartment;

DETAILED DESCRIPTION OF THE EMBODIMENTS

Figure 1:
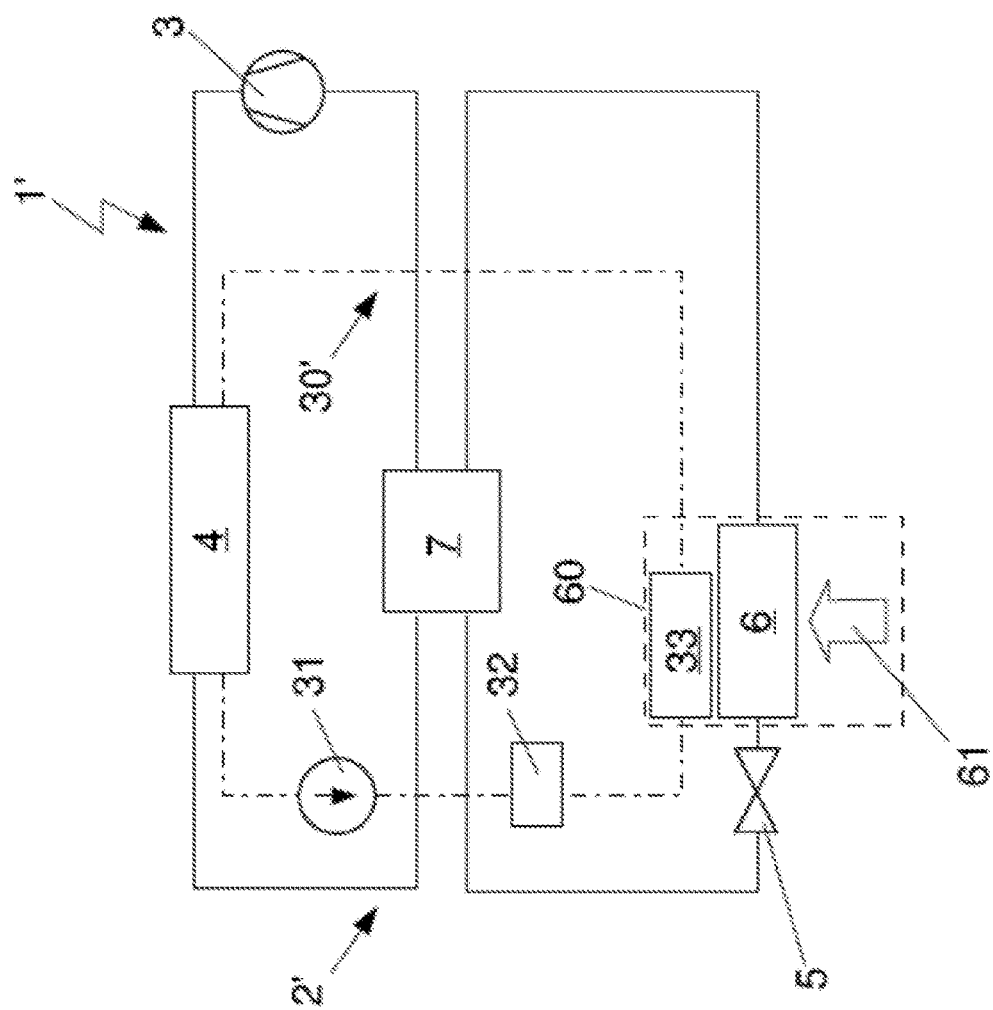
FIG. 1 shows a climate control system having a refrigeration circuit and a coolant circuit according to the prior art.
Figure 2A:
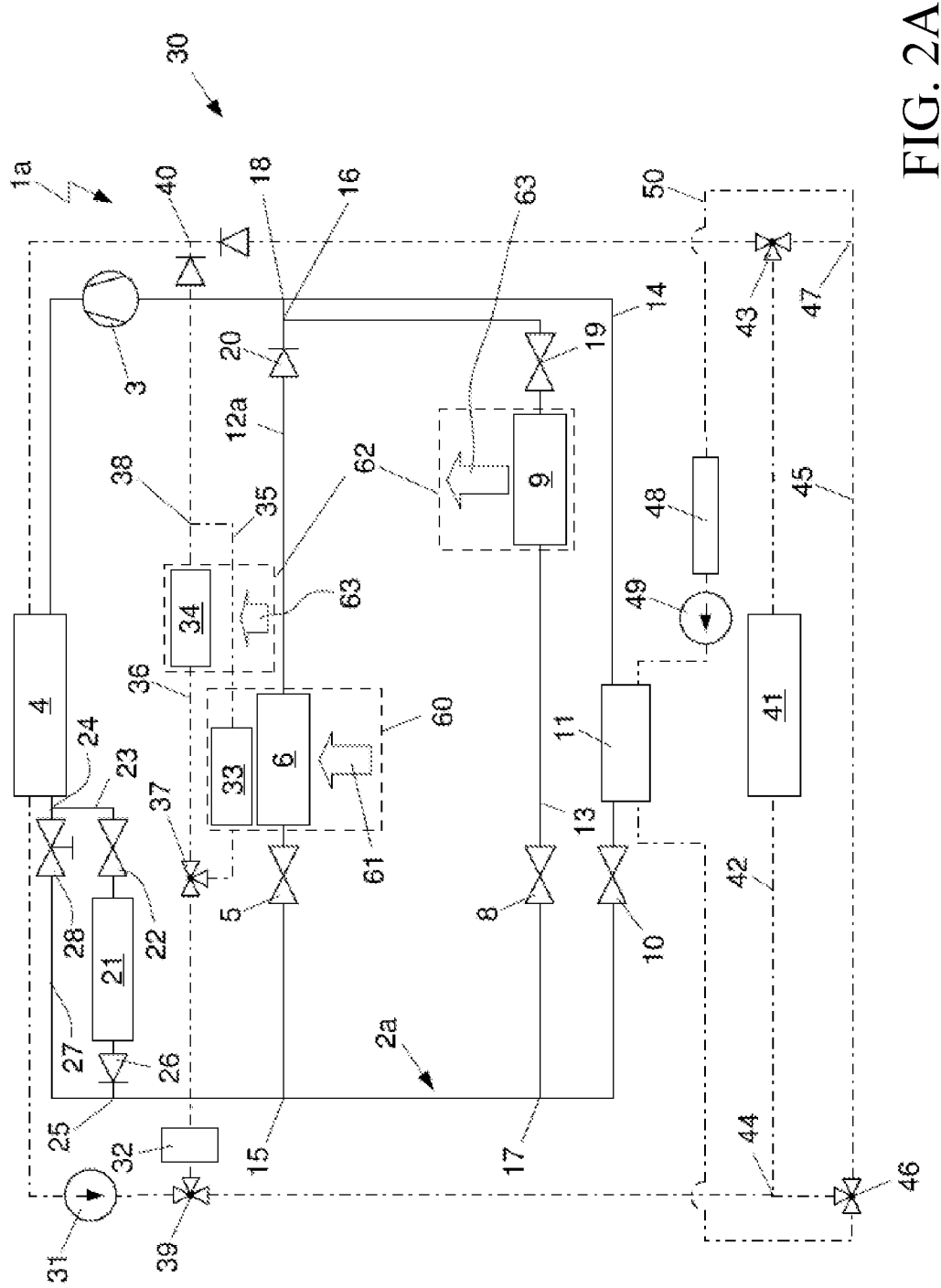
FIG. 2A: shows a climate control system having a refrigeration circuit, comprising a first and a second refrigerant-air heat exchanger for exchanging heat between the refrigerant and air inside an air conditioner and a third refrigerant-air heat exchanger for exchanging heat between the refrigerant and ambient air, a coolant circuit, comprising a first and a second coolant-air heat exchanger for exchanging heat between the coolant and air inside the air conditioner, and a third coolant-air heat exchanger for exchanging heat between the coolant and ambient air, and also two refrigerant-coolant heat exchangers which thermally connect the refrigeration circuit and the coolant circuit.

FIG. 2A shows a climate control system 1a having a refrigeration circuit 2a and a coolant circuit 30. The refrigeration circuit 2a, which is shown by solid lines, comprises, in the flow direction of the refrigerant, a compressor 3, a first refrigerant-coolant heat exchanger 4 operated as a condenser/gas cooler, a first expansion element 5, and a first refrigerant-air heat exchanger 6 for conditioning the intake air for the passenger compartment.

The refrigeration circuit 2a is moreover designed having a second refrigerant-air heat exchanger 9 for conditioning the intake air for the passenger compartment, from which a second expansion element 8 is upstream in the flow direction of the refrigerant. The first refrigerant-air heat exchanger 6 and the second refrigerant-air heat exchanger 9 are arranged so that refrigerant can be applied to them in parallel. The first refrigerant-air heat exchanger 6 and the associated first expansion element 5 are formed inside a first flow path 12a, which extends from a first diversion point 15 up to a first discharge point 16, while the second refrigerant-air heat exchanger 9 and the associated second expansion element 8 are formed inside a second flow path 13, which extends from a second diversion point 17 up to the first discharge point 16.

The refrigeration circuit 2a moreover comprises, in addition to the first flow path 12a and the second flow path 13, a third flow path 14, which extends from the second diversion point 17 up to a second discharge point 18. The discharge points 16, 18 are arranged upstream of the compressor 3 on the low-pressure side in the flow direction of the refrigerant.

The third flow path 14, which is formed in parallel to the first flow path 12a and the second flow path 13, especially to the first refrigerant-air heat exchanger 6 and the second refrigerant-air heat exchanger 9, comprises a second refrigerant-coolant heat exchanger 11 operated as an evaporator, from which a third expansion element 10 is connected upstream in the flow direction of the refrigerant. The second refrigerant-coolant heat exchanger 11 is provided in particular for the temperature control of a coolant circulating in a coolant circuit for conditioning components of the drivetrain, such as a battery or a motor and/or electrical components. The refrigerant-coolant heat exchanger 11, which is advantageously formed as a plate heat exchanger, is thus used for the absorption of additional available waste heat by the refrigerant.

Moreover, a fourth expansion element 19 is arranged downstream of the second refrigerant-air heat exchanger 9 inside the second flow path 13, so that the second refrigerant-air heat exchanger 9 is arranged between the second expansion element 8 and the fourth expansion element 19.

The formation of the expansion elements 5, 8, 10, which are connected upstream of the refrigerant-air heat exchangers 6, 9 or the refrigerant-coolant heat exchanger 11, respectively, in the flow direction of the refrigerant, and of the fourth expansion element 19 arranged downstream of the second refrigerant-air heat exchanger 9 enables the operation of the refrigeration circuit 2a at different pressure levels, in particular both in comparison of the refrigerant-air heat exchangers 6, 9 to one another and also in comparison to the second refrigerant-coolant heat exchanger 11. In this case, the refrigerant can flow through the refrigerant-air heat exchanger 6, 9 and the refrigerant-coolant heat exchanger 11 at the same pressure level in each case, such as the low pressure level, on the one hand. On the other hand, refrigerant at the low pressure level can be applied to the first refrigerant-air heat exchanger 6 and the second refrigerant-coolant heat exchanger 11, while refrigerant at a moderate pressure level or the high pressure level is applied to the second refrigerant-air heat exchanger 9. The respective pressure level is set by means of the expansion elements 5, 8, 10, 19, which are formed as expansion valves, wherein in particular the expansion elements 8, 19 arranged in the flow path 13 are continuously settable between the positions "fully open" and "closed".

The expansion elements 5, 8 upstream of the refrigerant-air heat exchangers 6, 9 in the flow direction of the refrigerant are preferably formed as expansion valves which can be shut off, while the fourth expansion element 19 arranged downstream of the second refrigerant-air heat exchanger 9 in the flow direction of the refrigerant, also referred to as a trailing throttle, is preferably formed as an active and passive pressure regulating element.

Moreover, a check valve 20 is arranged downstream of the first refrigerant-air heat exchanger 6 inside the first flow path 12a in the flow direction of the refrigerant, to prevent a backflow of refrigerant conducted through the second flow path 13 or the third flow path 14 into the first flow path 12a. The first refrigerant-air heat exchanger 6 is arranged between the first expansion element 5 and the check valve 20.

According to a first alternative embodiment (not shown), a further expansion valve is arranged downstream of the first refrigerant-air heat exchanger 6 inside the first flow path 12a in the flow direction of the refrigerant instead of the check valve 20, so that the first refrigerant-air heat exchanger 6 is arranged between the first expansion element 5 and the further expansion valve. In this case, the pressure levels and thus the temperature levels of the refrigerant are individually set by means of the expansion elements 19, which are arranged downstream of the refrigerant-air heat exchangers 6, 9 in the flow direction of the refrigerant and are formed as switchable expansion valves. The pressure levels and temperature levels of the refrigerant inside the refrigerant-air heat exchangers 6, 9 operated as an evaporator can thus be regulated independently of one another and of further components, in particular of the refrigerant-coolant heat exchanger 11.

According to a second alternative embodiment (also not shown), the fourth expansion element 19 is not arranged inside the second flow path 13, but rather between the first discharge point 16 of the first flow path 12a and the second flow path 13 and the second discharge point 18 of the third flow path 14. The pressure level and temperature level of the refrigerant inside the refrigerant-air heat exchangers 6, 9 operated as an evaporator are thus controllable jointly independently of further components, in particular of the refrigerant-coolant heat exchanger 11.

The refrigeration circuit 2a of the climate control system 1a comprises a third refrigerant-air heat exchanger 21 for the heat exchange between the refrigerant an ambient air after the first refrigerant-coolant heat exchanger 4 operated as a condenser/gas cooler in the flow direction of the refrigerant. The third refrigerant-air heat exchanger 21 is therefore arranged between the first refrigerant-coolant heat exchanger 4 and the first diversion point 15 of the first flow path 12a. In this case, a fifth expansion element 22 is upstream of the third refrigerant-air heat exchanger 21 to set the pressure level and/or the temperature level of the refrigerant inside the heat exchanger 21 depending on the operating mode of the climate control system 1a. The refrigerant-air heat exchanger 21 is preferably arranged outside the housing of the climate control system 1a, especially outside an air conditioner, and is also referred to as an ambient heat exchanger.

The third refrigerant-air heat exchanger 21 is formed having the associated and upstream expansion element 22 inside a fourth flow path 23, which extends from a third diversion point 24 up to a third discharge point 25. Moreover, a fifth flow path 27 is provided as a bypass around the third refrigerant-air heat exchanger 21 between the third diversion point 24 and the third discharge point 25. The fourth flow path 23 and the fifth flow path 27 extend in parallel to one another. A shutoff valve 28 is arranged inside the fifth flow path 27.

Moreover, a check valve 26 is arranged downstream of the third refrigerant-air heat exchanger 21 inside the fourth flow path 23 to prevent a backflow of refrigerant conducted through the bypass 27 into the fourth flow path 23. The third refrigerant-air heat exchanger 21 is arranged between the fifth expansion element 22 and the check valve 26.

A collector (not shown), also referred to as an accumulator, which is arranged before the compressor 3 in the flow direction of the refrigerant and thus on the low-pressure side, is used for separating and collecting refrigerant liquid. The compressor 3 suctions gaseous refrigerant out of the collector.

According to an alternative embodiment (not shown), the collector is integrated as a refrigerant accumulator inside the refrigerant-coolant heat exchanger 4 and thus arranged on the high pressure level of the refrigerant. In this case, the collector arranged on the low pressure level can be omitted. The refrigerant-coolant heat exchanger 4 can moreover be formed having a device for drying the refrigerant.

The refrigerant-coolant heat exchangers 4, 11 are used for thermally connecting the refrigeration circuit 2a to the coolant circuit 30. In this case, heat can be transferred from the refrigerant to the coolant in the first refrigerant-coolant heat exchange 4.

The coolant circuit 30 comprises a conveyor device 31 for circulating the coolant, in particular a pump, in the flow direction of the coolant after the first refrigerant-coolant heat exchanger 4, and also a first heating heat exchanger 33 as a first coolant-air heat exchanger for heating the intake air for the passenger compartment. The first refrigerant-coolant heat exchanger 4 operated on the refrigerant side as a condenser/gas cooler is therefore coolant cooled.

The coolant circuit 30 moreover comprises a second heating heat exchanger 34 formed as a coolant-air heat exchanger for heating the intake air for the passenger compartment. The first coolant-air heat exchanger 33 and the second coolant-air heat exchanger 34 are arranged so that coolant can be applied to them in parallel. The first coolant-air heat exchanger 33 is formed in this case inside a first flow path 35, while the second coolant-air heat exchanger 34 is formed inside a second flow path 36, wherein the flow paths 35, 36 each extend from a diversion point 37 up to a discharge point 38. The diversion point 37 is advantageously formed as a three-way valve.

Furthermore, the coolant circuit 30 is formed having an auxiliary heating heat exchanger 32 arranged between the conveyor device 31 and the diversion point 37 as a further heat source for heating the coolant. The heat transferred in the heat exchanger 32 to the coolant is available, for example, for heat transfer to the intake air for the passenger compartment.

Since the climate control system 1a is advantageously usable in motor vehicles having hybrid drive, in particular in motor vehicles having a battery, which can be charged both via an internal combustion engine and also at the power network, so-called plug-in hybrid vehicles, or for motor vehicles having classical internal combustion engine, the auxiliary heating heat exchanger 32 can also be used for cooling the internal combustion engine or the battery and/or of electrical components. The auxiliary heating heat exchanger 32 can moreover also be formed as an electrical resistance heater (PTC).

The coolant circuit 30 moreover comprises a third heat exchanger formed as a coolant-air heat exchanger 41, for example, for heat exchange with the ambient air. The third coolant-air heat exchanger 41 and the coolant-air heat exchangers 33, 34 for heating the intake air for the passenger compartment are arranged so that coolant can be applied to them in parallel. The third coolant-air heat exchanger 41 is formed inside a third flow path 42, which extends from a diversion point 39 up to a discharge point 40. The diversion point 39, which is arranged between the conveyor device 31 and the auxiliary heating heat exchanger 32, especially upstream of the auxiliary heating heat exchanger 32 in the flow direction of the coolant, is advantageously formed as a three-way valve.

Moreover, the coolant circuit 30 comprises a fourth flow path 45, which is formed between a diversion point 43, in particular a three-way valve, and a discharge point 44, and which is in turn formed in parallel to the flow paths 35, 36, 42 of the coolant-air heat exchangers 33, 34, 41. The fourth flow path 45 is used as needed in this case respectively as a bypass for conducting through the coolant without applying coolant to one or more of the coolant-air heat exchangers 33, 34, 41.

A further fifth flow path 50 of the coolant circuit 30 extends from a diversion point 46, in particular a three-way valve, up to a discharge point 47, and is in turn arranged in parallel to the flow paths 35, 36, 42 of the coolant-air heat exchangers 33, 34, 41 and to the fourth flow path 45 formed as a bypass.

The second refrigerant-coolant heat exchanger 11 of the refrigeration circuit 1a, a further heat exchanger 48, and a second conveyor device 49 are formed inside the fifth flow path 50. The heat exchanger 48 could be used for cooling components of the drivetrain, such as a battery or a motor and/or electrical components. The heat transferred as waste heat from the components of the drivetrain into the coolant circuit 30 can be emitted in the second refrigerant-coolant heat exchanger 11 to the refrigerant of the refrigeration circuit 1a and/or transferred in the first and/or second coolant-air heat exchanger 33, 34 to intake air of the passenger compartment.

The second conveyor device 49 is required, for example, if no heat is to be transferred from the refrigerant to the coolant in the first refrigerant-coolant heat exchanger 4 and heat is to be emitted from the coolant either via at least one of the coolant-air heat exchangers 33, 34 to the intake air for the passenger compartment and/or in the coolant-air heat exchanger 41 to the ambient air or in the second refrigerant-coolant heat exchanger 11 to the refrigerant. The first conveyor device 31 can be inactive in this case.

The coolant circuit 30 is moreover formed having check valves, which are each arranged upstream of the discharge point 40 of the third flow path 42 in the flow direction of the coolant. In this case, a first check valve is formed between the discharge point 38 of the first flow path 35 and the second flow path 36 and also the discharge point 40 and a second check valve is formed between the third coolant-air heat exchanger 41 and the discharge point 40. The check valves are each used for preventing a reverse flow of the coolant originating from the discharge point 40 into the corresponding region of the coolant circuit 30.

The first refrigerant-air heat exchanger 6 of the refrigeration circuit 2a and the first heating heat exchanger 33 of the coolant circuit 30 are arranged inside an air conditioner, in particular inside a first component 60 of the air conditioner, so that the intake air of the passenger compartment can be applied to them in succession in the specified sequence in the flow direction 61 of the air. Therefore, the intake air for the passenger compartment which is cooled and/or dehumidified as it flows over the first refrigerant-air heat exchanger 6 operated as an evaporator can be heated as needed as it flows over the first heating heat exchanger 33. The flow against the first heating heat exchanger 33 with air previously conditioned as it flows over the first refrigerant-air heat exchanger 6 can be controlled by means of a temperature flap (not shown).

In this case, the first component 60 of the air conditioner arranged in the front region of the motor vehicle can have air exhausted from the passenger compartment, ambient air as fresh air, or a mixture made of air exhausted from the passenger compartment and ambient air flowing through it. The intake air conditioned as it flows through the first component 60 of the air conditioner arranged in the front region of the motor vehicle is preferably introduced into the passenger compartment in the region of the front seats.

The second refrigerant-air heat exchanger 9 of the refrigeration circuit 2a and the second coolant-air heat exchanger 34 of the coolant circuit 30 can be arranged inside the air conditioner, in particular inside a second component 62 of the air conditioner, so that the intake air of the passenger compartment can be applied to them in the specified sequence in succession in the flow direction 63 of the air. Therefore, the intake air for the passenger compartment which is cooled and/or dehumidified as it flows over the second refrigerant-air heat exchanger 9 operated as an evaporator can be heated if needed as it flows over the second heating heat exchanger 34. The flow against of the second heating heat exchanger 34 with air previously conditioned as it flows over the second refrigerant-air heat exchanger 9 can be controlled by means of a temperature flap (not shown).

In this case, the second component 62 of the air conditioner, which is arranged, for example, in the middle or rear region of the motor vehicle, can in particular have air exhausted from the passenger compartment flowing through it. The air conditioned as it flows through the second component 62 of the air conditioner is introduced into the passenger compartment as intake air for the passenger compartment, preferably in the region of further seats or seat rows differing from the front seats or moved into the surroundings. The mass flows can be allocated in the ratio between 0 and 100%.

The climate control system 1a, in particular during operation with recirculated air, i.e., with air exhausted from the passenger compartment, can also be operated at temperatures of the outside air having values below 0° C., without the risk of icing over of the heat exchange surface of the refrigerant-air heat exchangers 6, 9 operated as evaporators.

To ensure this operation, refrigerant at a moderate pressure level is applied as needed to the second refrigerant-air heat exchanger 9 arranged in the second component 62 of the air conditioner and it is operated as an evaporator. The latent heat to be dissipated from the air during the dehumidifying of the air entering the evaporator 9 is used in this case together with the power supplied to the refrigerant during the compression in the compressor 3 to in each case heat the intake air for the passenger compartment to a desired exit temperature. The heat absorbed by the refrigerant is transferred in the coolant-cooled first refrigerant-coolant heat exchanger 4 to the coolant, which emits the absorbed heat as it flows through the heating heat exchangers 33, 34 to the intake air for the passenger compartment. The refrigerant is expanded after the outflow from the second refrigerant-air heat exchanger 9 as it flows through the expansion element 19 to the low pressure level, at which the second refrigerant-coolant heat exchanger 11 is also operated.

During the operation of the climate control system 1a in the heat pump mode and/or in the reheating mode, a heat transferable to the intake air of the passenger compartment in the heating heat exchangers 33, 34 can be composed of the energies transferred in the first refrigerant-air heat exchanger 6 operated as an evaporator and/or in the second refrigerant-air heat exchanger 9 operated as an evaporator and in the compressor 3, which are transferred as a total in the first refrigerant-coolant heat exchanger 4 to the coolant, to achieve a sufficient temperature of the intake air for the passenger compartment.

As needed, i.e., if the heat provided in the refrigeration circuit 2a for heating the intake air of the passenger compartment during operation in the heat pump mode or in the reheating mode is not sufficient and an additional heat absorption is necessary, the refrigerant-coolant heat exchanger 11 can be used as an additional heat source, wherein the third expansion element 10 is opened and the refrigerant vaporizes as it flows through the heat exchanger 11 while absorbing heat.

During the operation of the climate control system 1a in the heat pump mode, the expansion element 8 positioned upstream of the second refrigerant-air heat exchanger 9 operated as a condenser/gas cooler can be opened or regulated in such a way as to let the refrigerant pass without pressure loss or to expand it to a moderate pressure level. Refrigerant at a high pressure level or a moderate pressure level is applied to the second refrigerant-air heat exchanger 9 operated in this case as a condenser/gas cooler and if needed can preheat the intake air for the passenger compartment flowing into the second component 62 of the air conditioner. The refrigerant is subsequently expanded to a low pressure level as it flows through the fourth expansion element 19, at which the second refrigerant-coolant heat exchanger 11 is also operated. The intake air is further heated as it flows over the heating heat exchanger 33, 34 to which the coolant is applied.

It is to be ensured in this case that the refrigerant is sufficiently overheated as a suction gas before the compressor 3, for example, by mixing with a partial mass flow conducted through the first flow path 12a and/or the third flow path 14, to ensure the reliable operation of the compressor 3.

The coolant is circulated and heated as it flows through the first refrigerant-coolant heat exchanger 4 independently of the operating mode.

The formation of the expansion elements 5, 8 upstream of the refrigerant-air heat exchangers 6, 9 in the flow direction of the refrigerant and of the expansion element 19 arranged downstream of the second refrigerant-air heat exchanger 9 enables the operation of the refrigeration circuit 2a at different pressure levels, in particular inside the refrigerant-air heat exchangers 6, 9 in relation to one another and also inside the second refrigerant-air heat exchanger 9 in comparison to the second refrigerant-coolant heat exchanger 11 as a heat source. In this case, the refrigerant can flow through the second refrigerant-air heat exchanger 9 at a high pressure level, a moderate pressure level, or a low pressure level, while refrigerant at low pressure level is applied to the first refrigerant-air heat exchanger 6 and the second refrigerant-coolant heat exchanger 11. The respective pressure level is set by means of the expansion elements 5, 8, 10, 19 formed as expansion valves, wherein especially the expansion elements 8, 19 are continuously settable between the settings "fully open" and "closed".

The change between the different operating modes can take place under continuing operation of the compressor 3, an interruption of the operation of the compressor 3 is not necessary. The operation of the refrigeration circuit 2a is thus possible continuously and without adversely affecting the vehicle occupants.

In the two independent components 60, 62 of the air conditioner having the refrigerant-air heat exchangers 6, 9 each operated independently of one another, in particular as evaporators, the mass flows of the refrigerant are each controlled in a load-dependent manner by the expansion elements 5, 8, which are upstream of the refrigerant-air heat exchangers 6, 9 and are formed as switchable expansion valves. In this case, for example, the powers of the first refrigerant-air heat exchanger 6 operated as an evaporator inside the first component 60 of the air conditioner arranged in the front region of the motor vehicle or of the second refrigerant-air heat exchanger 9 operated as an evaporator inside the second component 62 of the air conditioner arranged in the middle or rear region of the motor vehicle can be reduced continuously down to "zero" at full power of the compressor 3 at the same time, if, for example, only the seats or seat rows differing from the front seats of a motor vehicle having autonomous vehicle control are occupied. Thus, one of the refrigerant-air heat exchangers 6, 9, in particular the first evaporator 6, can be operated at full load with low pressure of the refrigerant, for example, at a target temperature of 3° C. at maximum fan power, while the other refrigerant-air heat exchanger 6, 9, in particular the second evaporator 9, is operated in a mode at minimal fan power at a target temperature of 8° C. In this case, ambient air or fresh air can be applied to the first evaporator 6, while air from the passenger compartment is applied to the second evaporator 9 in recirculated air operation, wherein the heat exchanger surface does not ice over.

In air conditioners known from the prior art having two refrigerant-air heat exchangers operated as evaporators for conditioning the passenger compartment, the evaporator arranged inside the second component of the air conditioner provided for the middle or rear region of the motor vehicle usually ices over, which is operated at minimal fan power in comparison to the high fan evaporator of the first component of the air conditioner. In these conventional air conditioners, either the fan power of the second component of the air conditioner then has to be increased or the expansion element associated with the refrigerant-air heat exchanger of the second component of the air conditioner has to be closed to prevent the application of refrigerant to the heat exchanger, which in turn results in elevation of the temperature of the intake air.

Using the fourth expansion element 19 operated as a trailing throttle, a local increase of the evaporation pressure of the refrigerant inside the refrigerant-air heat exchanger 9 is enabled. In this case, the evaporator power can be reduced by elevating the evaporation temperature, also referred to as the evaporator useful temperature.

To further enhance the efficiency during the operation of the climate control system 1a in the heat pump mode, the second component 62 of the air conditioner can be used to transfer heat from air exhausted from the passenger compartment to the refrigerant in the ideal settable temperature range via the second refrigerant-air heat exchanger 9. Since the second component 62 of the air conditioner is arranged in the rear region of the motor vehicle, in particular in the tail region, the air which is strongly cooled after the heat transfer to the refrigerant can be moved directly into the surroundings.

The waste heat of the components of the drivetrain is supplied during operation of the climate control system 1a in the heat pump mode and during operation in the reheating mode to the components 60, 62 of the air conditioner, respectively, and thus via the coolant-air heat exchanger 33, 34 to the intake air for the passenger compartment.

During operation in the refrigeration mode, the waste heat of the components of the drivetrain is transferred to the ambient air in the third coolant-air heat exchanger 41, which is also referred to as a low temperature cooler. The third coolant-air heat exchanger 41 is arranged in the front region of the motor vehicle, for example, to use travel wind as air flowing against the heat exchanger.

If the heating power required in the refrigeration circuit 30 is not sufficient to achieve a desired level of comfort, the auxiliary heating heat exchanger 32, which is formed in particular as an electrical resistance heater (PTC), can be put into operation. However, the required heating power is very low because of the diverse waste heat utilization.

The coolant heated by the absorption of the waste heat is distributed accordingly via the controllable three-way valves 37, 39, 43, 46.

Figure 2B:
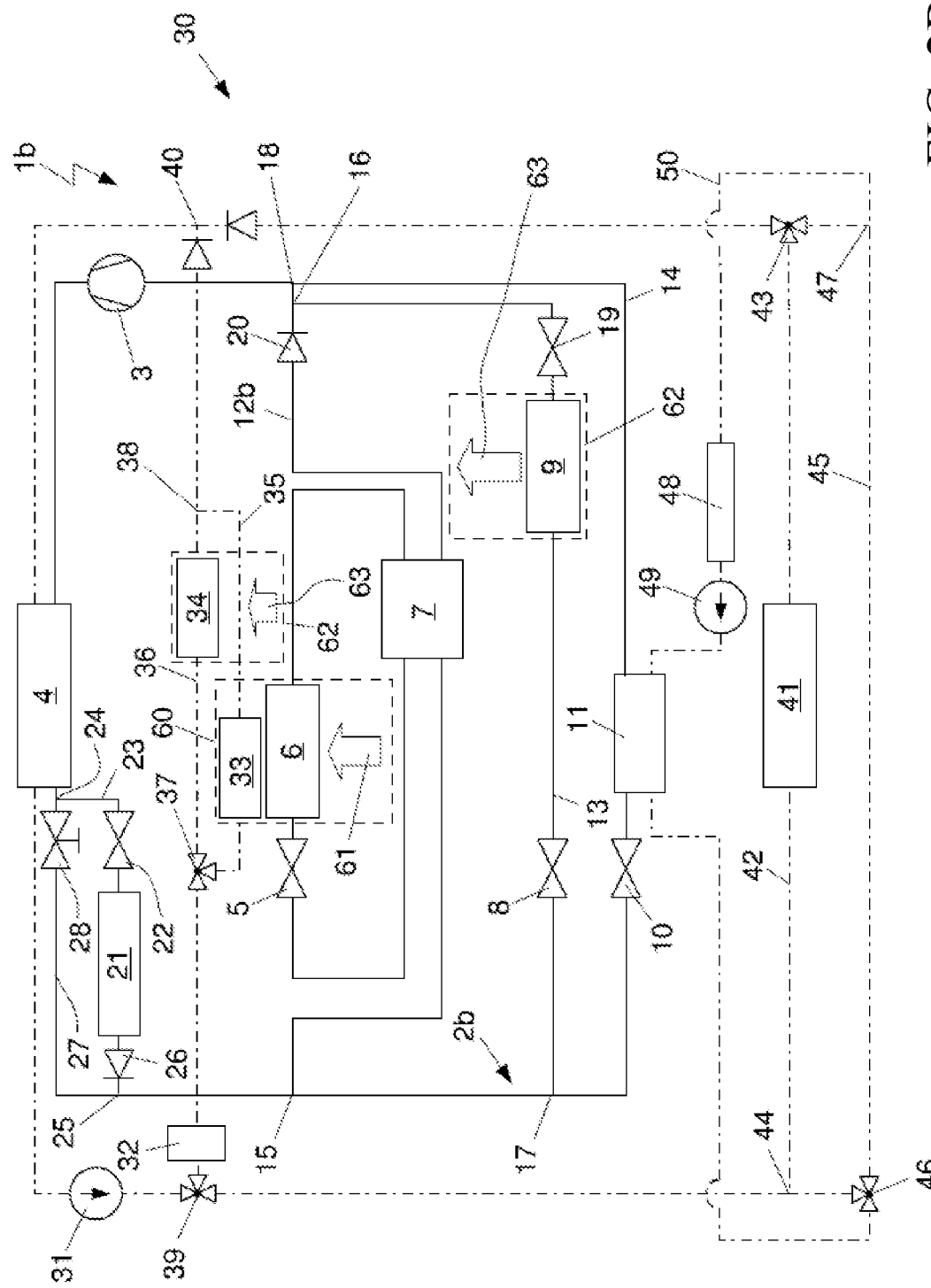
FIG. 2B: shows a climate control system similar to the climate control system according to FIG. 2A having a refrigeration circuit, comprising an internal heat exchanger.

FIG. 2B shows a climate control system 1b similar to the climate control system 1a according to FIG. 2A. The essential difference of the climate control systems 1a, 1b is in the formation of the refrigeration circuits 2a, 2b, in particular of the first flow path 12a, 12b, wherein the refrigeration circuit 2b comprises an internal heat exchanger 7, which is arranged completely inside the first flow path 12b, in comparison to the refrigeration circuit 2a.

In this case, the internal heat exchanger 7 is formed on the high-pressure side between the first diversion point 15 and the first expansion element 5 and also on the low-pressure side between the first refrigerant-air heat exchanger 6 and the first discharge point 16. The internal heat exchanger 7 is used in this case for the heat exchange between the refrigerant at high pressure and the refrigerant at low pressure inside the first flow path 12b, wherein, on the one hand, liquid refrigerant flowing out of the first refrigerant-coolant heat exchanger 4 operated as a condenser/gas cooler and flowing into the first flow path 12b is further cooled and, on the other hand, the refrigerant exiting from the first refrigerant-air heat exchanger 6 operated as an evaporator as a suction gas is superheated before the compressor 3. In addition to the protection of the compressor 3 from liquid slugging, using the operation of the refrigeration circuit 2b with internal heat exchanger 7, in comparison to the operation without the internal heat exchanger 7, the specific compressor power can be reduced and simultaneously the specific refrigeration power can be increased, in particular of the first refrigerant-air heat exchanger 6, and thus the efficiency of the operation of the climate control system 1b.

The check valve 20 provided in the first flow path 12b is arranged between the internal heat exchanger 7 and the first discharge point 16 to prevent a backflow of refrigerant conducted through the second flow path 13 or the third flow path 14 into the first flow path 12b.

FIG. 3 shows the first component 60 of the air conditioner for conditioning the intake air for a front region of the passenger compartment. The intake air for the passenger compartment is applied in succession to the first refrigerant-air heat exchanger 6 and first coolant-air heat exchanger 33 arranged in succession in the flow direction 61 of the intake air of the passenger compartment.

The first refrigerant-air heat exchanger 6 extends over the entire flow cross section of a housing 64 of the first component 60 of the air conditioner, so that the entire air mass flow supplied to the component 60 flows over the heat exchange surface of the refrigerant-air heat exchanger 6.

Subsequently, the air mass flow can be heated if needed as it flows over the first coolant-air heat exchanger 33. The flow against the first coolant-air heat exchanger 33 is controlled by means of an air guiding unit 65 formed as a temperature flap. In this case, the air mass flow can be conducted as a partial air mass flow over the heat exchange surface of the first coolant-air heat exchanger 33 or as a partial air mass flow through a bypass around the first coolant-air heat exchanger 33, respectively, before the air mass flow is introduced, possibly mixed again, as intake air into the passenger compartment. The exit temperature of the intake air from the component 60 is also set by the mixing of the air. The partial air mass flows can be allocated in the ratio between 0 and 100%.

FIG. 4 shows a first embodiment of the second component 62, 62a of the air conditioner for conditioning the intake air for a middle or rear region of the passenger compartment. Intake air for the passenger compartment can be applied in succession to the second refrigerant-air heat exchanger 9 and second coolant-air heat exchanger 34, which are arranged in succession in the flow direction 63, 63a of the air of the passenger compartment.

The second refrigerant-air heat exchanger 9 does not extend in this case over the entire flow cross section of a housing 66a of the second component 62a of the air conditioner, so that the air mass flow flowing into the second component 62a in the flow direction 69a can be conducted as a partial air mass flow over the heat exchange surface of the second refrigerant-air heat exchanger 9 or as a partial mass flow through a bypass around the second refrigerant-air heat exchanger 9, respectively. The flow against the second refrigerant-air heat exchanger 9 is controlled by means of an air guiding unit 68 formed as a temperature flap. The mass flows of the air can be allocated in the ratio between 0 and 100%.

The air mass flow can subsequently be moved as needed as a partial air mass flow through the opening formed inside the housing 66a into the surroundings, can be heated as a partial air mass flow as it flows over the second coolant-air heat exchanger 34, or can be conducted as a partial air mass flow as intake air for the passenger compartment in a bypass around the second coolant-air heat exchanger 34, respectively. The flow against the second coolant-air heat exchanger 34 is controlled by means of an air guiding unit 67 formed as a temperature flap. To move the air, for example, as the cold air cooled as it flows over the second refrigerant-air heat exchanger 9 operated as an evaporator, in the flow direction 71a into the surroundings, a setting of an air guiding unit 70a preferably formed as a flap is varied. The air guiding unit 70a is used for opening and closing the opening formed in the housing 66a.

In this case, the intake air for the passenger compartment which is conducted as a partial air mass flow over the heat exchange surface of the second coolant-air heat exchanger 34 or as a partial air mass flow through a bypass around the second coolant-air heat exchanger 34 can optionally be mixed again. The exit temperature of the intake air from the second component 62a is also set by the mixing of the air. The mass flows of the air can each be allocated in the ratio between 0 and 100%.

If, for example, during the operation of the climate control system 1a, 1b in the heat pump mode, the waste heat of the air of the passenger compartment is used, a partial air mass flow is cooled and/or dehumidified as it flows over the heat exchange surface of the second refrigerant-air heat exchanger 9 operated as an evaporator and also subsequently moved into the surroundings through the open air guiding unit 70a. A further partial air mass flow is heated as it flows over the heat exchange surface of the second coolant-air heat exchanger 34 and conducted to the passenger compartment.

The air flows through essentially from the front to the rear region of the passenger compartment, so that all vehicle occupants uniformly receive comfort. The arrangement of the air exit openings in the rear region of the motor vehicle minimizes the risk of entering rainwater or inflowing undesired air. The required openings are formed in mass production vehicles.

Figure 5B:
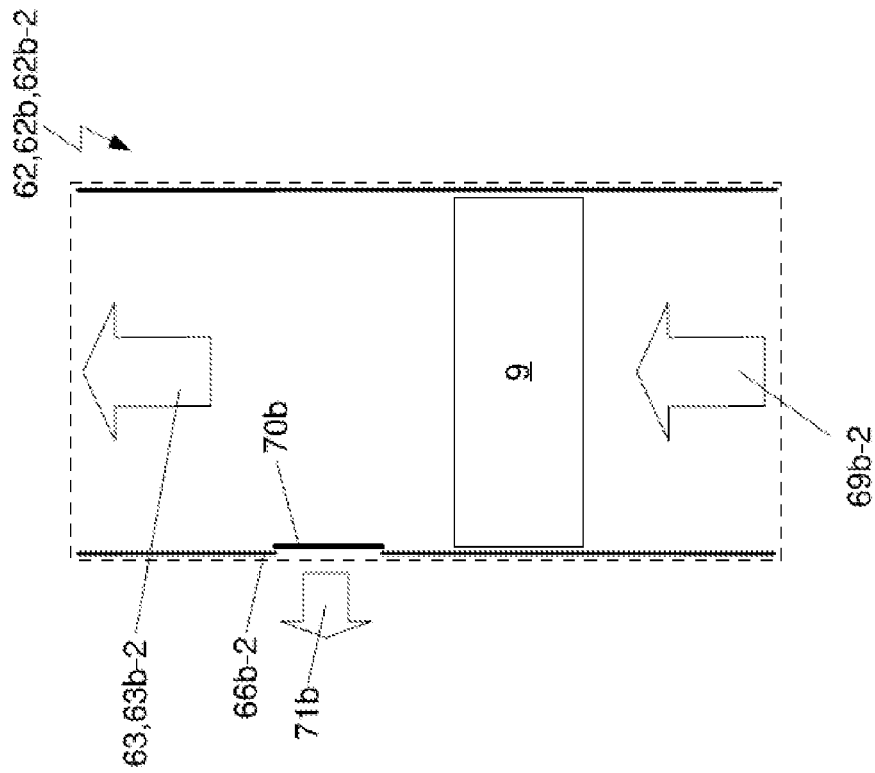
FIG. 5B: shows a second element of the second embodiment of the second component of an air conditioner for conditioning the intake air for the middle and rear regions of the passenger compartment.
Figure 5A:
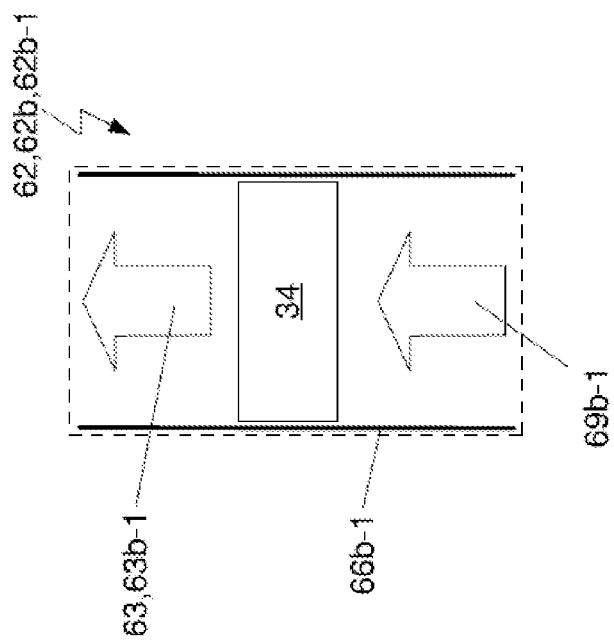
FIG. 5A: shows a first element of a second embodiment of a second component of an air conditioner for conditioning the intake air for the middle and rear regions of the passenger compartment.
Figure 7A:
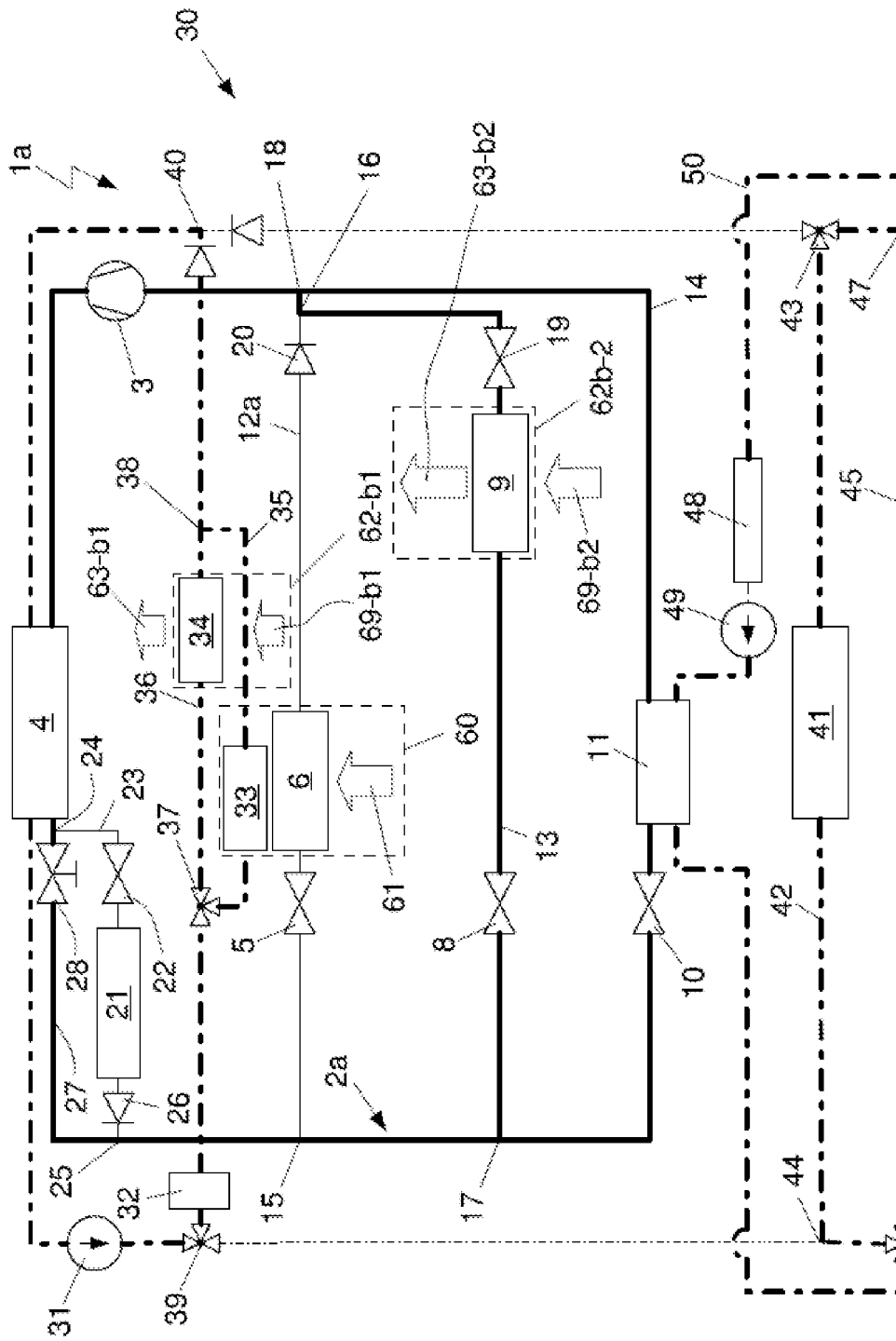
FIG. 7A: shows the climate control system according to FIG. 2A during operation in a heat pump mode.

FIG. 5A shows a second embodiment of the second component 62, 62b of the air conditioner for conditioning the intake air for a middle or rear region of the passenger compartment. A first element 62b-1 of the second component 62, 62b is shown in FIG. 7A, while a second element 62b-2 of the second component 62, 62b is shown in FIG. 5B. In comparison to the first embodiment of the second component 62a of the air conditioner from FIG. 4, the second refrigerant-air heat exchanger 9 and the second coolant-air heat exchanger 34 are arranged in housings 66b-1, 66b-2 formed separately from one another. In this case, the second coolant-air heat exchanger 34 is arranged inside the housing 66b-1 of the first element 62b-1 of the second component 62b and the second refrigerant-air heat exchanger 9 is arranged inside the housing 66b-2 of the second element 62b-2 of the second component 62b of the air conditioner. In particular air exhausted from the passenger compartment can be applied to the heat exchangers 9, 34 independently of one another.

The coolant-air heat exchanger 34 extends over the entire flow cross section of the housing 66b-1, so that the entire air mass flow supplied to the first element 62b-1 of the second component 62b via a fan in the flow direction 69b-1 flows over the heat exchange surface of the coolant-air heat exchanger 34 and is heated. The heated air is supplied again to the passenger compartment in the flow direction 63b-1.

The refrigerant-air heat exchanger 9 extends over the entire flow cross section of the housing 66b-2, so that the entire air mass flow supplied to the second element 62b-2 of the second component 62b via a fan in the flow direction 69b-2 flows over the heat exchange surface of the refrigerant-air heat exchanger 9 and is also cooled and/or dehumidified. The air mass flow conditioned in this manner can subsequently be moved as needed as a partial air mass flow through an opening formed inside the housing 66b-2 into the surroundings or conducted as a partial air mass flow as intake air in the flow direction 63b-2 into the passenger compartment. To move the cold air cooled as it flows over the refrigerant-air heat exchanger 9 operated as an evaporator in the flow direction 71b into the surroundings, a position of an air guiding unit 70b preferably formed as a flap is varied. The air guiding unit 70b is used in this case for opening and closing the opening formed in the housing 66b-2. The mass flows of the air can be allocated in the ratio between 0 and 100%.

The second element 62b-2 of the second component 62b of the air conditioner is formed having the opening provided as an air outlet to the surroundings and also having the associated air guiding unit 70b and its control and/or operating mechanism preferably as an adapter element, which is arranged as an adapter unit downstream of the evaporator 9 in the flow direction 69b-2 of the air. A conventional tail air conditioner can be retrofitted by means of the adapter.

The air conditioner from FIGS. 5A and 5B, which is divided in two in comparison to the first embodiment of the second component 62a of the air conditioner from FIG. 4, is formed without bypass paths around the refrigerant-air heat exchanger 9 and the coolant-air heat exchanger 34 and without associated air guiding units for conducting and allocating the air mass flows, but with an additional fan. The additional fan is used for conveying the air mass flow through the first element 62b-1 of the second component 62b and thus through the coolant-air heat exchanger 34. The air conditioners according to FIG. 4, on the one hand, and FIGS. 5A and 5B, on the other hand, are controlled and operated in the same manner in this case.

FIGS. 6A to 9B each show the climate control system 1a according to FIG. 2A during operation in various operating modes. In particular in FIGS. 6A, 7A, 8, and 9A, the lines of the refrigeration circuit 2a through which refrigerant flows or the lines of the coolant circuit 30 which coolant flows, respectively, are each identified with thicker lines than the respective unoccupied lines. In each of FIGS. 6B, 7B, 9B, the climate control system 1a is shown integrated into a motor vehicle, wherein the coolant circuit 30 is only shown in each case having the components for direct heating of the intake air for the passenger compartment for better comprehensibility.

Figure 6A:
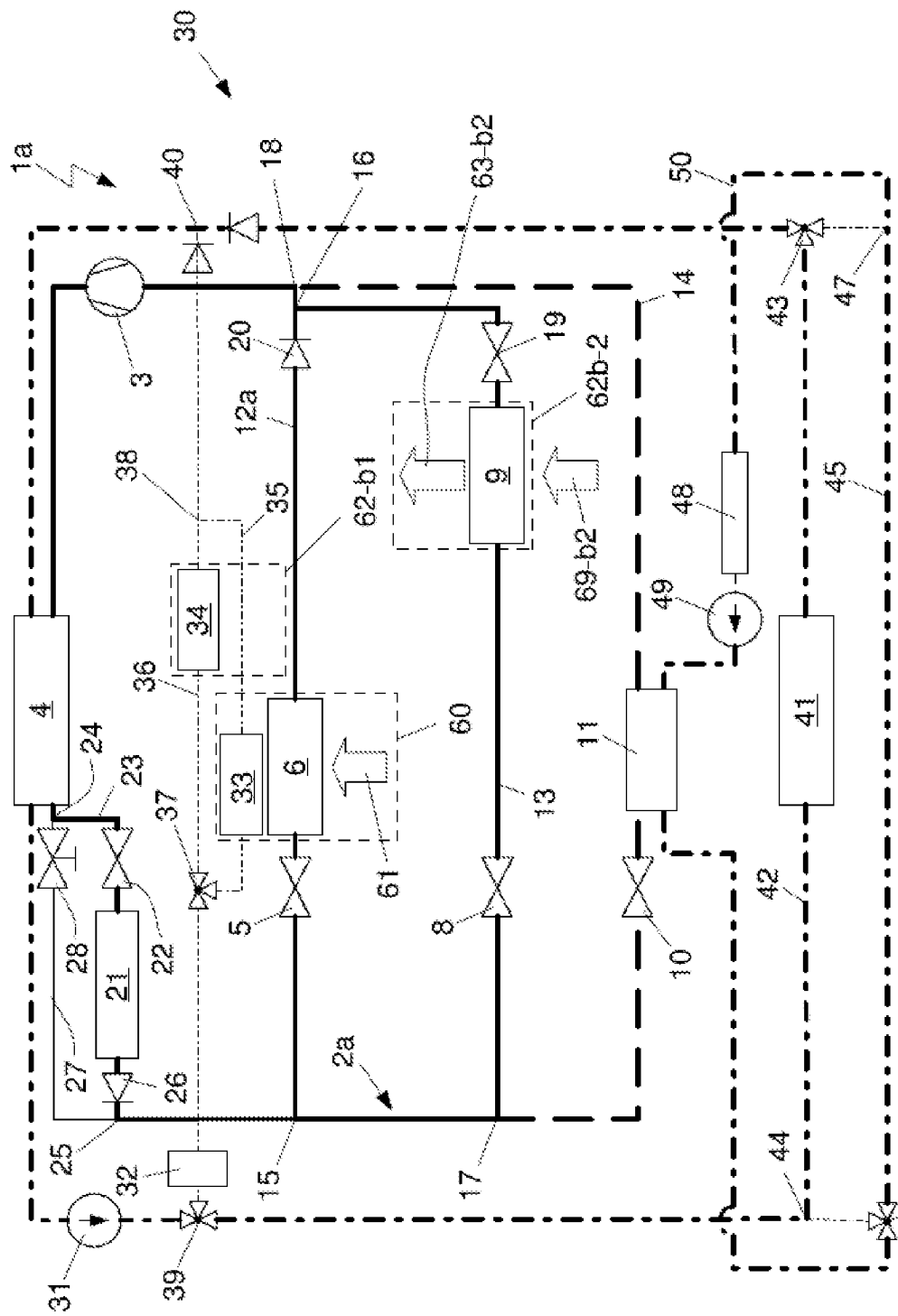
FIG. 6A: shows the climate control system according to FIG. 2A during operation in a refrigeration mode.
Figure 6B:
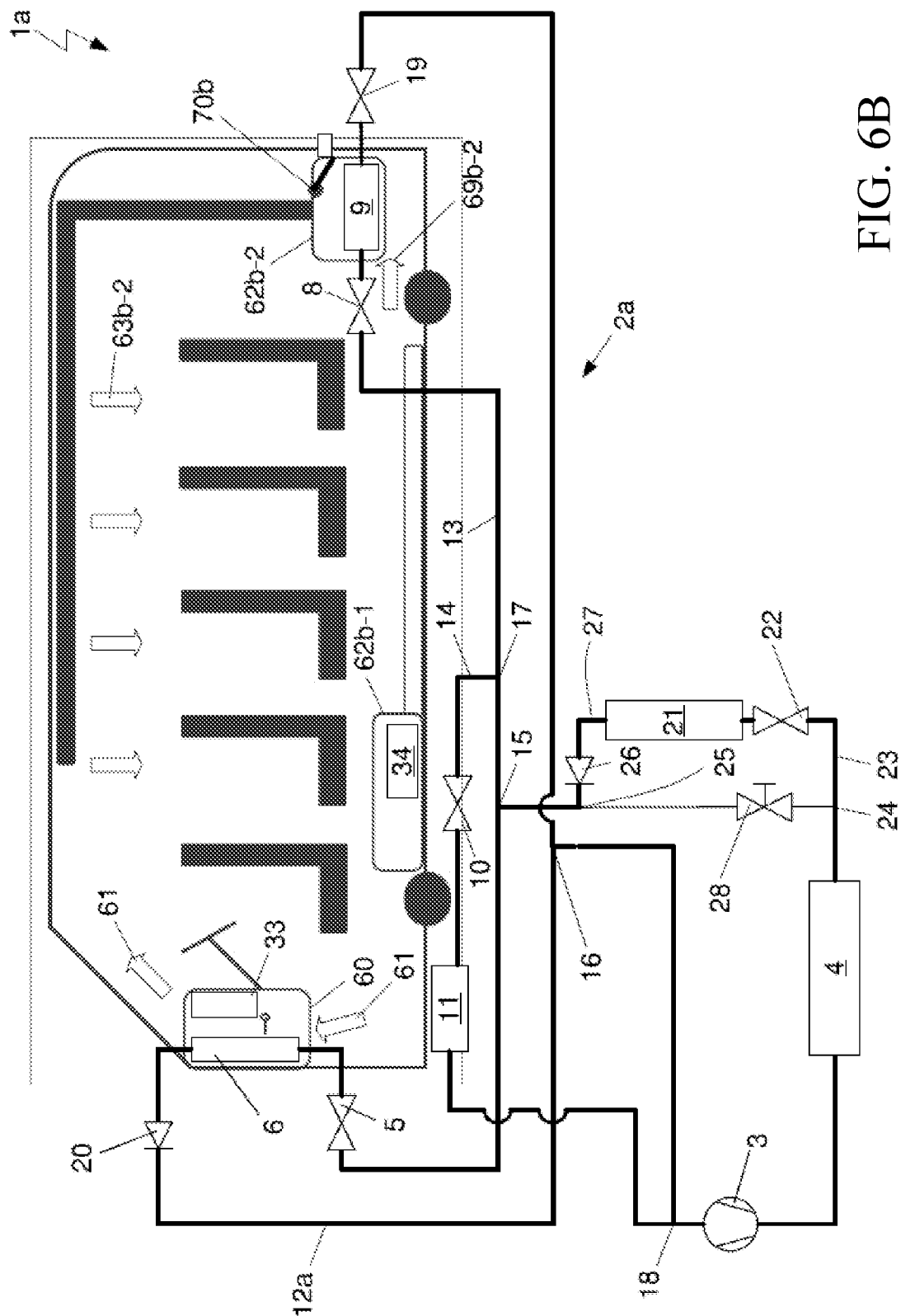
FIG. 6B: shows the climate control system according to FIG. 6A integrated into a motor vehicle.

During the operation of the refrigeration circuit 2a in a refrigeration mode according to FIGS. 6A and 6B, both the first refrigerant-air heat exchanger 6 arranged inside the first component 60 of the air conditioner and also the second refrigerant-air heat exchanger 9 arranged inside the second element 62b-2 of the second component 62b of the air conditioner are operated as evaporators for cooling and/or dehumidifying the air.

The fresh air suctioned out of the surroundings in the flow direction 61 into the first component 60 of the air conditioner, recirculated air from the passenger compartment, or mixed air made of fresh air and recirculated air flows over the heat exchange surface of the first refrigerant-air heat exchanger 6 and is introduced in cooled and/or dehumidified form into the passenger compartment in the front region. The recirculated air from the passenger compartment suctioned in the flow direction 69b-2 into the second element 62b-2 of the second component 62b of the air conditioner flows over the heat exchanger surface of the second refrigerant-air heat exchanger 9 and is introduced in cooled and/or dehumidified form into the passenger compartment in the rear and in the middle region. In this case, the second element 62b-2 of the second component 62b of the air conditioner is formed in such a way that preferably multiple air outlets are arranged in the passenger compartment in the region of the roof, so that the conditioned intake air flows from above and locally distributed into the passenger compartment in the flow direction 63b-2. The air guiding unit 70b is aligned to close the opening formed in the housing 66b-2 of the second element 62b-2 of the second component 62b of the air conditioner, so that the conditioned air is introduced completely into the passenger compartment.

No heat is transferred to the intake air for the passenger compartment both in the first coolant-air heat exchanger 33 arranged inside the first component 60 of the air conditioner and also in the second coolant-air heat exchanger 34 arranged inside the first element 62b-1 of the second component 62b of the air conditioner. The second refrigerant-coolant heat exchanger 11 for the temperature control of the coolant circulating in the coolant circuit 30 for conditioning components of the drivetrain, such as a battery or a motor and/or electrical components, can also be operated as an evaporator and refrigerant can be applied thereto in parallel to the refrigerant-air heat exchangers 6, 9. In the optional mode of cooling the components of the drivetrain, the waste heat transferred from the components of the drivetrain in the heat exchanger 48 to the coolant in the coolant circuit 30 is emitted as heat to the refrigerant of the refrigeration circuit 2a in the second refrigerant-coolant heat exchanger 11. The conveyor device 49 is in operation, as is the conveyor device 31 of the coolant, so that coolant circulates in each case in two branches formed separately from one another of the coolant circuit 30.

The heat transferred in each case in the evaporators 6, 9, 11 to the refrigerant is transferred as needed, i.e., for example, heat quantity to be discharged and ambient temperature, in the refrigerant-coolant heat exchanger 4 to the coolant and in the third coolant-air heat exchanger 41 from the coolant to the ambient air, and/or in the third refrigerant-air heat exchanger 21 directly to the ambient air.

During the transfer of the heat from the refrigerant to the coolant in the refrigerant-coolant heat exchanger 4 and from the refrigerant to the ambient air in the refrigerant-air heat exchanger 21, the fifth expansion element 22 of the refrigeration circuit 2a can be completely open, as shown in FIGS. 6A and 6B, so that the refrigerant passes the expansion element 22 without pressure loss and the third refrigerant-air heat exchanger 21 is operated as an additional condenser/gas cooler at high pressure level of the refrigerant. The shutoff valve 28 and thus the bypass 27 around the third refrigerant-air heat exchanger 21 are closed.

During the operation (not shown) having the transfer of the heat in the refrigerant-air heat exchanger 21 from the refrigerant exclusively to the ambient air, the conveyor device 31 of the coolant circuit 30 can be inactive, so that coolant does not flow through the refrigerant-coolant heat exchanger 4.

During the operation (not shown) having the transfer of the heat in the refrigerant-coolant heat exchanger 4 from the refrigerant exclusively to the coolant, the expansion element 22 is closed and also the shutoff valve 28 and thus the bypass 27 around the refrigerant-air heat exchanger 21 are open.

The three-way valve 39 of the coolant circuit 30 is switched in operation of the climate control system 1a according to FIG. 6A in such a way that the entire mass flow of the coolant conveyed by the conveyor device 31 is conducted through the third flow path 42, while coolant is not applied to the first and second flow path 35, 36. Moreover, the three-way valves 43, 46 of the coolant circuit 30 are switched in such a way that the coolant circulates through the fourth flow path 45 and the fifth flow path 50 and also the two branches of the coolant circuit 30 are separated from one another.

Figure 7B:
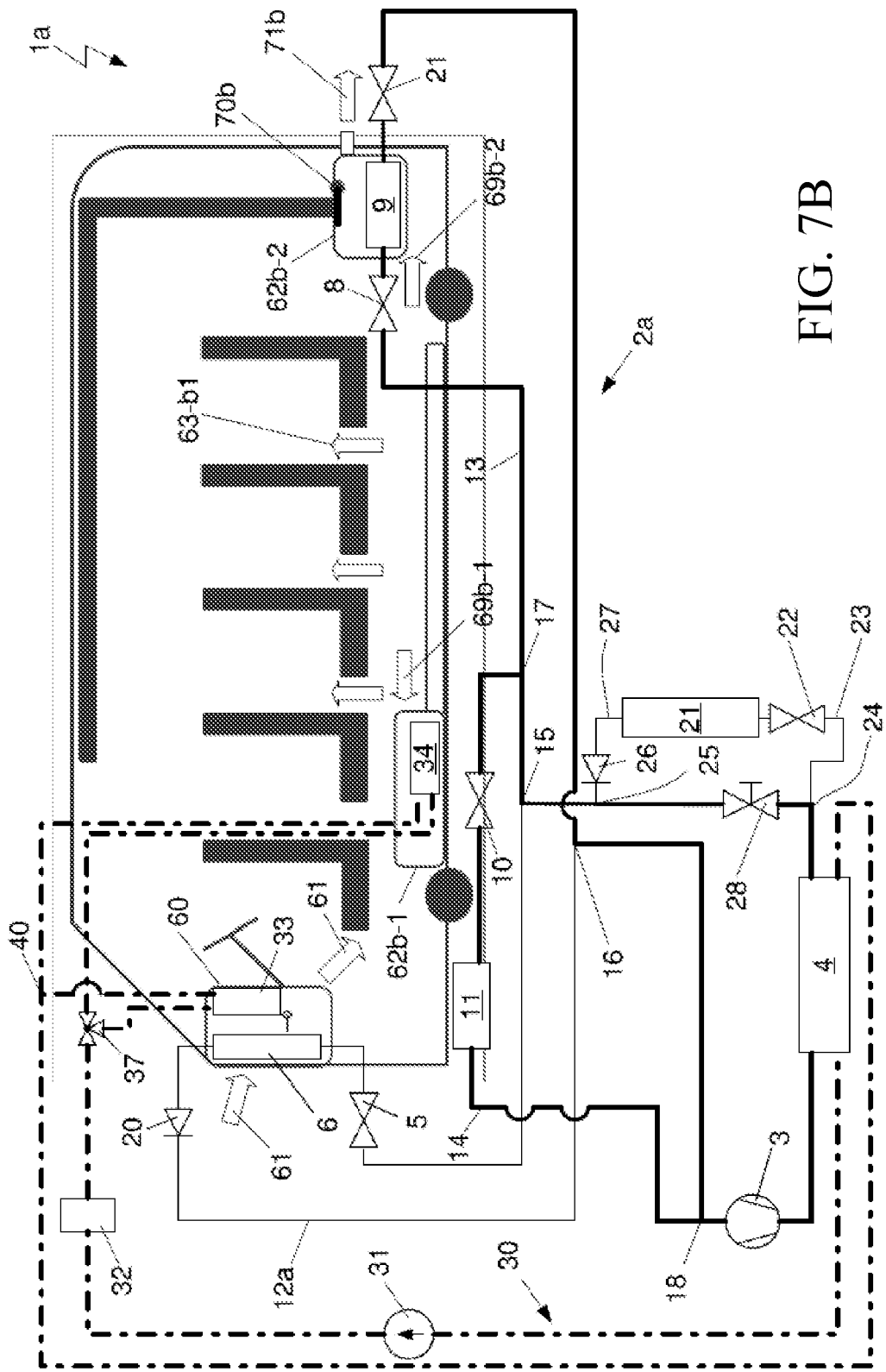
FIG. 7B: shows the climate control system according to FIG. 7A integrated into a motor vehicle.

During the operation of the refrigeration circuit 2a in a first heat pump mode according to FIGS. 7A and 7B, the second refrigerant-air heat exchanger 9 arranged inside the second element 62b-2 of the second component 62b of the air conditioner and also the second refrigerant-coolant heat exchanger 11 for the temperature control of the coolant circulating in the coolant circuit for conditioning components of the drivetrain are each operated as an evaporator and thus as a heat source for the refrigerant. Refrigerant is not applied to the first refrigerant-air heat exchanger 6 arranged inside the first component 60 of the air conditioner.

The recirculated air from the passenger compartment suctioned in the flow direction 69b-2 into the second element 62b-2 of the second component 62b of the air conditioner flows over the heat exchange surface of the second refrigerant-air heat exchanger 9 and is discharged into the surroundings in cooled and/or dehumidified form. The air guiding unit 70b is aligned to completely open the opening formed in the housing 66b-2 of the second element 62b-2 of the second component 62b of the air conditioner, so that the air is moved completely into the surroundings in the flow direction 71b.

The heat transferred in the heat exchangers 9, 11 to the refrigerant is transferred in the refrigerant-coolant heat exchanger 4 completely to the coolant and from the coolant to the intake air for the passenger compartment. In this case, the fifth expansion element 22 of the refrigeration circuit 2a is closed, so that refrigerant is not applied to the fourth flow path 23 and thus the third refrigerant-air heat exchanger 21. The shutoff valve 28 and thus the bypass 27 around the third refrigerant-air heat exchanger 21 are completely opened. The three-way valve 39 of the coolant circuit 30 is switched in such a way that the entire mass flow of the coolant conveyed by the conveyor device 31 is conducted, allocated into partial mass flows, through the first and second flow path 35, 36 and thus the heating heat exchangers 33, 34.

If the heating power in the coolant circuit 30 required for reaching a desired level of comfort is not sufficient, moreover the auxiliary heating heat exchanger 32, formed in particular as an electrical resistance heater (PTC), is put into operation. Heat is transferred to the intake air for the passenger compartment both in the first coolant-air heat exchanger 33 arranged inside the first component 60 of the air conditioner and also in the second coolant-air heat exchanger 34 arranged inside the first element 62b-1 of the second component 62b.

The air suctioned in the flow direction 61 into the first component 60 of the air conditioner flows over the heat exchange surface of the first coolant-air heat exchanger 33 and is introduced in heated form into the passenger compartment in the front region. The recirculated air from the passenger compartment suctioned in the flow direction 69b-1 into the first element 62b-1 of the second component 62b flows over the heat exchange surface of the second coolant-air heat exchanger 34 and is introduced in heated form into the passenger compartment in the rear and in the middle region. In this case, the first element 62b-1 of the second component 62b of the air conditioner is formed in such a way that preferably multiple air outlets are arranged in the passenger compartment in the region of the footwell, so that the heated intake air flows in the flow direction 63b-1 from below and locally distributed into the passenger compartment.

The heat transferred during the cooling of the components of the drivetrain in the heat exchanger 48 into the coolant circuit 30 is emitted in the second refrigerant-coolant heat exchanger 11 to the refrigerant of the refrigeration circuit 1a, but can also be fractionally transferred if needed in the third coolant-air heat exchanger 41 to the ambient air. The conveyor device 49 is in operation, as is the conveyor device 31 of the coolant, so that coolant circulates in each case in two branches of the coolant circuit 30 formed separately from one another. In this case, the three-way valves 43, 46 of the coolant circuit 30 are switched in such a way that the coolant circulates through the third flow path 42, the fourth flow path 45, and the fifth flow path 50, and also the two branches of the coolant circuit 30 are separated from one another.

Figure 8:
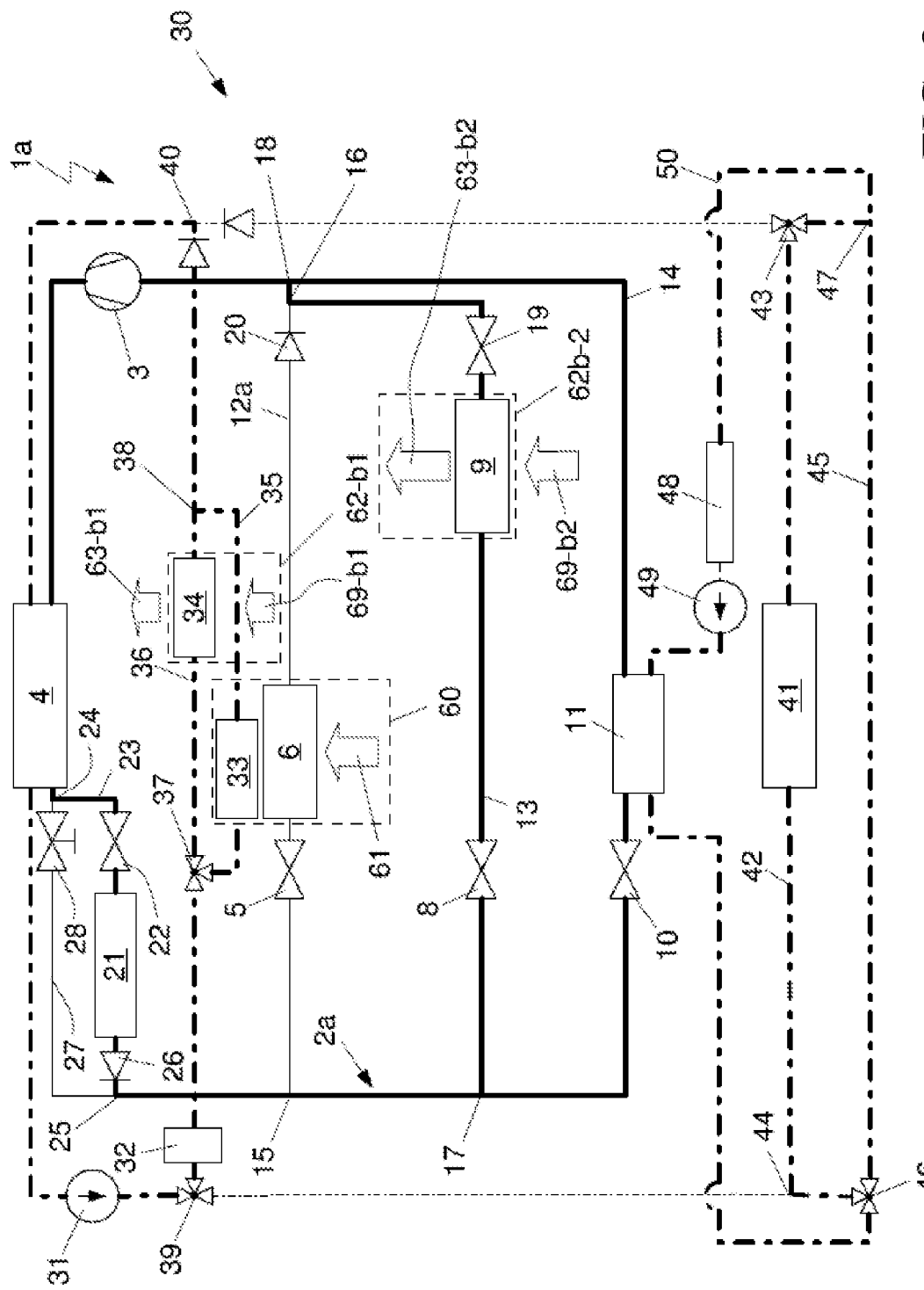
FIG. 8: shows the climate control system according to FIG. 2A during operation in further heat pump modes.

During the operation of the refrigeration circuit 2a in further heat pump modes according to FIG. 8, as during the operation of the refrigeration circuit 2a according to FIG.

7A, the second refrigerant-air heat exchanger 9 arranged inside the second element 62b-2 of the second component 62b of the air conditioner and also the second refrigerant-coolant heat exchanger 11 for the temperature control of the coolant circulating in the coolant circuit for conditioning of components of the drivetrain are each operated as an evaporator and thus as a heat source for the refrigerant. Refrigerant is not applied to the first refrigerant-air heat exchanger 6 arranged inside the first component 60 of the air conditioner.

The essential difference of the operations of the refrigeration circuit 2a in the further heat pump modes according to FIG. 8 in comparison to the heat pump mode according to FIG. 7A is the application to the third refrigerant-air heat exchanger 21, i.e., the application to the ambient heat exchanger and thus the use of the ambient air as an additional heat source to provide sufficient heating power for heating the air of the passenger compartment. In this case, the fifth expansion element 22 of the refrigeration circuit 2a is open, so that the refrigerant flows through the expansion element 22 while expanding from the high pressure level to a lower pressure level, while the shutoff valve 28 and thus the bypass 27 around the third refrigerant-air heat exchanger 21 are closed. The third refrigerant-air heat exchanger 21 is operated in each case as an additional evaporator, if needed at an adapted pressure level of the refrigerant between high pressure level and low pressure level. In addition to the absorption of heat of the refrigerant from the exhaust air from the passenger compartment in the second refrigerant-air heat exchanger 9 and from the coolant in the second refrigerant-coolant heat exchanger 11, which absorbs the heat from the components of the drivetrain, or in the third coolant-air heat exchanger 41 from the ambient air, respectively, the refrigerant is also vaporized in the third refrigerant-air heat exchanger 21 while absorbing heat from the ambient air.

If only a small amount of additional heat is to be transferred from the ambient air to the refrigerant via the third refrigerant-air heat exchanger 21, for example, in the case of pre-heated air of the passenger compartment, the ambient heat exchanger is operated at a moderate pressure level of the refrigerant. The refrigerant flowing out of the first refrigerant-coolant heat exchanger 4 at high pressure level is expanded in the fifth expansion element 22 to a middle pressure level or to a moderate pressure level and also introduced as a two-phase mixture into the ambient heat exchanger. While absorbing heat, liquid of the refrigerant is vaporized before the refrigerant is now expanded to low pressure level as it flows through the second expansion element 8 and the third expansion element 10 and subsequently supplied to the evaporators 9, 11.

If a greater demand for additional heat to be absorbed from the ambient air to the refrigerant exists via the third refrigerant-air heat exchanger 21, for example, in the case of non-preheated air of the passenger compartment, the ambient heat exchanger is operated at low pressure level of the refrigerant. The refrigerant flowing at high pressure level out of the first refrigerant-coolant heat exchanger 4 is expanded to the low pressure level in the fifth expansion element 22 and also introduced as a two-phase mixture into the ambient heat exchanger. At least one fraction of the liquid of the refrigerant is evaporated while absorbing heat before the refrigerant is now conducted through the completely open second expansion element 8 or the completely open third expansion element 10, respectively, to the evaporators 9, 11, in which the refrigerant is completely evaporated while absorbing heat.

Reference is made to the statements on the operation of the climate control system 1a in the first heat pump mode according to FIGS. 7A and 7B on the operation of the coolant circuit 30 for absorbing heat of the components of the drivetrain in the heat exchanger 48 and emitting the heat to the refrigerant in the evaporator 11.

The third refrigerant-air heat exchanger 21 is operated during the operation of the refrigeration circuit 2a in the refrigeration mode as a condenser/gas cooler for emitting heat from the refrigerant to the ambient air and during the operation of the refrigeration circuit 2a in a heat pump mode as an evaporator for absorbing heat from the refrigerant from the ambient air.

Figure 9A:
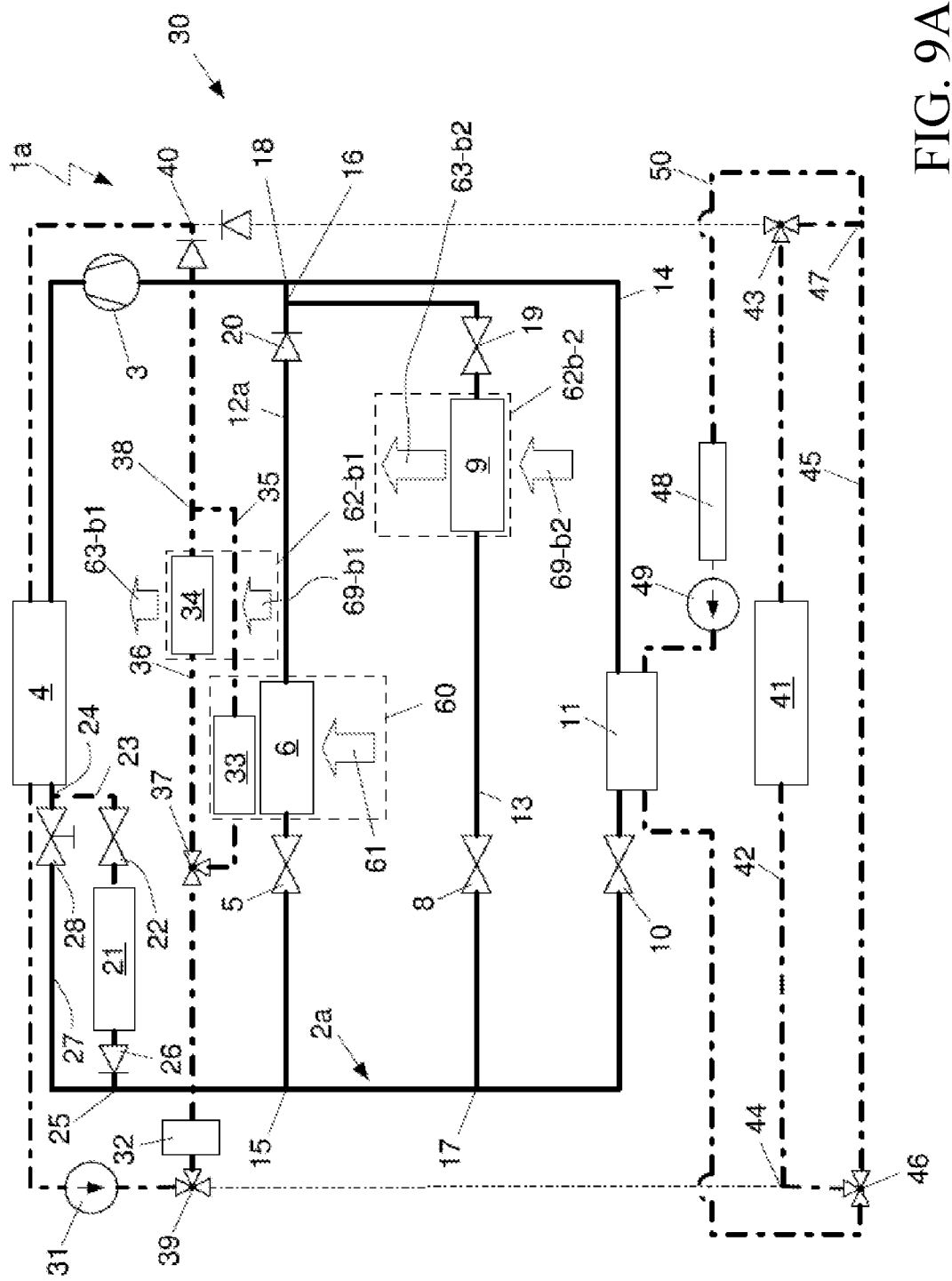
FIG. 9A: shows the climate control system according to FIG. 2A during operation in a reheating mode.
Figure 9B:
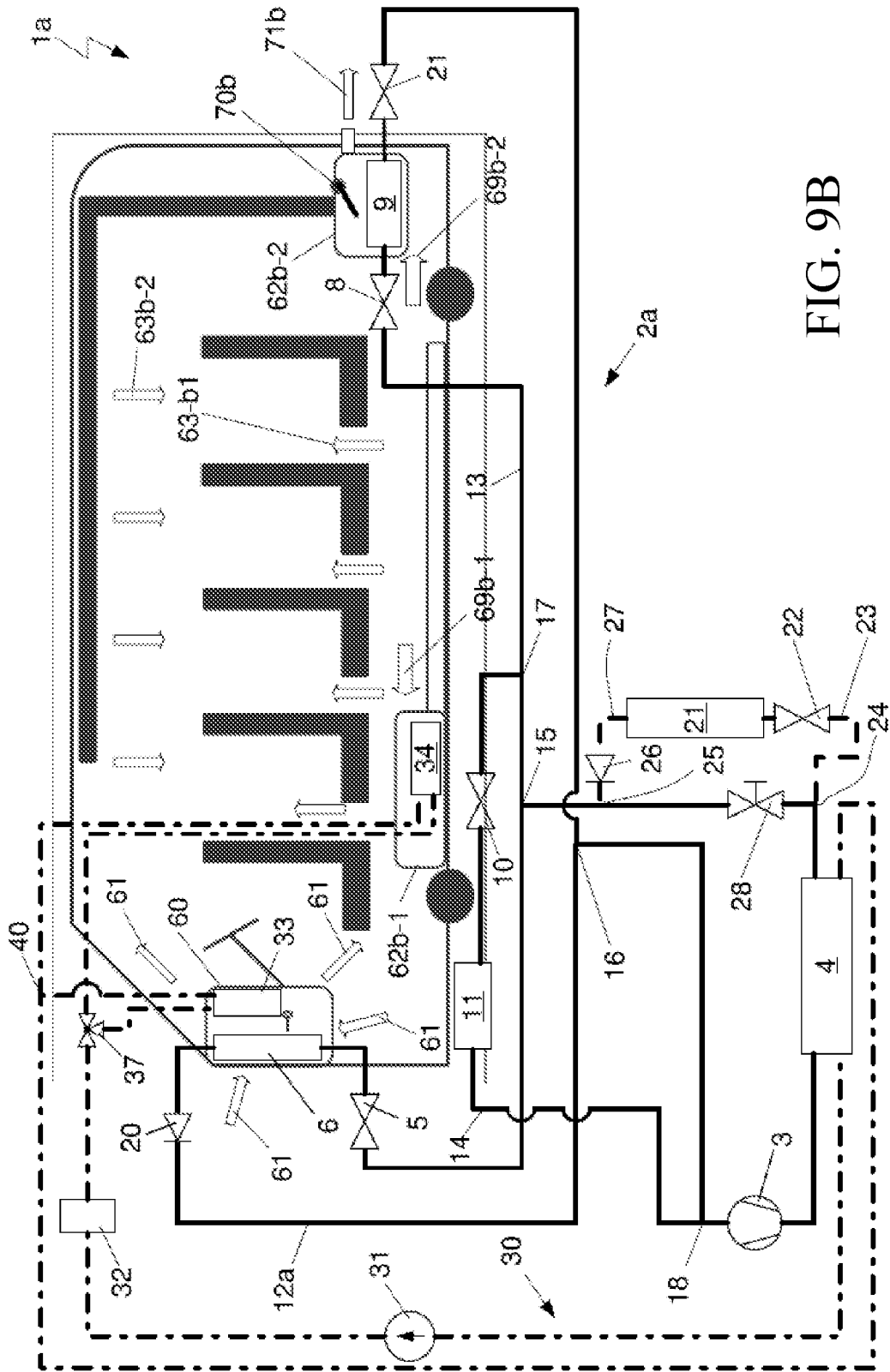
FIG. 9B: shows the climate control system according to FIG. 9A integrated into a motor vehicle.

During the operation of the refrigeration circuit 2a in a reheating mode according to FIGS. 9A and 9B, both the first refrigerant-air heat exchanger 6 arranged inside the first component 60 of the air conditioner and also the second refrigerant-air heat exchanger 9 arranged inside the second element 62b-2 of the second component 62b of the air conditioner are operated as evaporators for cooling and/or dehumidifying the air. The second refrigerant-coolant heat exchanger 11 for the temperature control of the coolant circulating in the coolant circuit for conditioning components of the drivetrain can also be operated as an evaporator and thus as a heat source for the refrigerant.

The heat transferred to the refrigerant in the heat exchangers 6, 9, 11 is transferred in the refrigerant-coolant heat exchanger 4 as needed either completely to the coolant or fractionally to the coolant and in the third refrigerant-air heat exchanger 21 to the ambient air and from the coolant to the intake air for the passenger compartment. In this case, the fifth expansion element 22 of the refrigeration circuit 2a is either closed and the shutoff valve 28 is open, according to FIGS. 9A and 9B, so that refrigerant is not applied to the fourth flow path 23 and thus the third refrigerant-air heat exchanger 21, or the fifth expansion element 22 of the refrigeration circuit 2a is completely open and the shutoff valve 28 is closed to emit heat from the refrigerant to the ambient air in the refrigerant-air heat exchanger 21. The three-way valve 39 of the coolant circuit 30 is switched in such a way that the entire mass flow of the coolant conveyed by the conveyor device 31 is conducted allocated into partial mass flows through the first and second flow path 35, 36 and thus the heating heat exchangers 33, 34.

The fresh air suctioned from the surroundings in the flow direction 61 into the first component 60 of the air conditioner, recirculated air from the passenger compartment, or mixed air made of fresh air and recirculated air flows over the heat exchange surface of the first refrigerant-air heat exchanger 6 and is cooled and/or dehumidified, is heated as it flows over the heat exchange surface of the first coolant-air heat exchanger 33, and is introduced into the passenger compartment in the front region.

The recirculated air from the passenger compartment suctioned in the flow direction 69b-2 into the second element 62b-2 of the second component 62b of the air conditioner flows over the heat exchange surface of the second refrigerant-air heat exchanger 9 and is cooled and/or dehumidified and introduced fractionally as needed into the passenger compartment in the rear and in the middle region in the flow direction 63-b2 and discharged in the flow direction 71b into the surroundings. The air guiding unit 70b is aligned to partially close the opening formed in the housing 66b-2 of the second element 62b-2 of the second component 62b of the air conditioner, so that the conditioned air is introduced into the passenger compartment and moved into the surroundings in allocated form.

The heat transferred to the refrigerant in the refrigerant-air heat exchangers 6, 9 is transferred in the refrigerant-coolant heat exchanger 4 to the coolant and in the coolant-air heat exchangers 33, 34 from the coolant to the intake air for the passenger compartment and possibly also to the ambient air.

The recirculated air from the passenger compartment suctioned in the flow direction 69b-1 into the first element 62b-1 of the second component 62b of the air conditioner flows over the heat exchange surface of the second coolant-air heat exchanger 34 and is introduced into the passenger compartment in heated form in the rear and in the middle region in the flow direction 63-b1.

Reference is made to the statements on the operation of the climate control system 1a in the first heat pump mode according to FIGS. 7A and 7B on the operation of the coolant circuit 30 for cooling the components of the drivetrain in the heat exchanger 48.

The refrigeration circuit 2a and the described operating modes are usable for any refrigerant which passes through a phase transition from liquid to gaseous on the low-pressure side. On the high-pressure side, the medium emits the absorbed heat to at least one heat sink by way of gas cooling/condensation and super cooling. Natural materials, such as R744, R717 and similar, combustible materials such as R290, R600, R600a and similar, chemical materials, such as R134a, R152a, HFO-1234yf, and diverse refrigerant mixtures are usable as refrigerants.

LIST OF REFERENCE SIGNS

1', 1a, 1b climate control system
2', 2a, 2b refrigeration circuit
3 compressor
4 first refrigerant-coolant heat exchanger
5 first expansion element
6 first refrigerant-air heat exchanger, evaporator
7 internal heat exchanger
8 second expansion element
9 second refrigerant-air heat exchanger, evaporator
10 third expansion element
11 second refrigerant-coolant heat exchanger, evaporator
12a, 12b first flow path
13 second flow path
14 third flow path
15 first diversion point
16 first discharge point
17 second diversion point
18 second discharge point
19 fourth expansion element
20 check valve
21 third refrigerant-air heat exchanger
22 fifth expansion element
23 fourth flow path
24 third diversion point
25 third discharge point
26 check valve
27 fifth flow path, bypass
28 shutoff valve
30', 30 coolant circuit
31 conveyor device
32 auxiliary heating heat exchanger
33 first coolant-air heat exchanger, heating heat exchanger
34 second coolant-air heat exchanger, heating heat exchanger
35 first flow path
36 second flow path
37, 43, 46 diversion point, three-way valve
38, 40, 44, 47 discharge point
39 diversion point, three-way valve
41 third coolant-air heat exchanger
42 third flow path
45 fourth flow path
48 heat exchanger
49 second conveyor device
50 fifth flow path
60 first component of air conditioner
61 flow direction of intake air of passenger compartment in first component
60 first component of air conditioner
62, 62a, 62b second component of air conditioner
62b-1 first element of second component of air conditioner 62b
62b-2 second element of second component of air conditioner 62b
63, 63a flow direction of intake air of passenger compartment in second component 62
63b-1, 63b-2 flow direction of intake air of passenger compartment in second component
64 housing of first component 60
65 air guiding unit of heating heat exchanger 33
66a, 66b-1, 66b-2 housing of second component 62, 62a
67 air guiding unit of heating heat exchanger 34
68 air guiding unit
69a, 69b-1, 69b-2 flow direction of intake air in second component of air conditioner 62
70a, 70b air guiding unit
71a, 71b flow direction of cold air

What is claimed is:

1. A climate control system of a motor vehicle comprising:
a refrigeration circuit; and
a coolant circuit, the refrigeration circuit further comprising:
a compressor;
a refrigerant-coolant heat exchanger operable as a condenser/gas cooler for heat exchange between a refrigerant and a coolant of the coolant circuit; and
a first refrigerant-air heat exchanger for conditioning an intake air for a passenger compartment having a first expansion element arranged upstream in a flow direction of the refrigerant,
the coolant circuit further comprising:
a first conveyor device; and
at least one first coolant-air heat exchanger for heating the intake air for the passenger compartment and the first refrigerant-coolant heat exchanger, wherein the refrigeration circuit is formed having a supplemental refrigerant-air heat exchanger of the refrigeration circuit for exchanging heat between the refrigerant and ambient air, wherein the supplemental refrigerant-air heat exchanger of the refrigeration circuit is arranged downstream of the first refrigerant-coolant heat exchanger in the flow direction of the refrigerant and an expansion element is upstream of the supplemental refrigerant-air heat exchanger of the refrigeration circuit in the flow direction of the refrigerant, wherein the refrigeration circuit is formed having a second refrigerant-air heat exchanger for conditioning the intake air for the passenger compartment, wherein a second expansion element is upstream of the second refrigerant-air heat exchanger in the flow direction of the refrigerant, and the coolant circuit is formed having a second coolant-air heat exchanger for heating the intake air for the passenger compartment, wherein the first refrigerant-air heat exchanger of the refrigeration circuit and the first coolant-air heat exchanger of the coolant circuit are arranged inside a first component of an air conditioner and so the intake air for the passenger compartment can be applied to the first refrigerant-air heat exchanger of the refrigeration circuit and the first coolant-air heat exchanger of the coolant circuit in succession in a flow direction of the intake air, and wherein the second refrigerant-air heat exchanger of the refrigeration circuit and the second coolant-air heat exchanger of the coolant circuit are arranged inside a second component of the air conditioner, wherein the second component comprises an opening formed in a wall of a housing for discharging air into surroundings and an air guiding unit for opening and closing the opening, and wherein the opening is formed arranged downstream of the second refrigerant-air heat exchanger in the flow direction of the air.

2. The climate control system as claimed in claim 1, wherein the first component of the air conditioner is formed so that air exhausted from the passenger compartment or the ambient air or a mixture made of air exhausted from the passenger compartment and the ambient air can flow through it.

3. The climate control system as claimed in claim 1, wherein the second component of the air conditioner is formed so that air exhausted from the passenger compartment can flow through the second component, wherein the air can be discharged into the passenger compartment or into surroundings.

4. The climate control system as claimed in claim 1, wherein the expansion element upstream of the supplemental refrigerant-air heat exchanger of the refrigeration circuit for exchanging heat between the refrigerant and the ambient air and the supplemental refrigerant-air heat exchanger of the refrigeration circuit are arranged inside a first flow path of the refrigeration circuit, and wherein a second flow path is formed as a bypass to the first flow path having the supplemental refrigerant-air heat exchanger of the refrigeration circuit, wherein the first flow path and the second flow path are each formed extending between a diversion point and a discharge point.

5. The climate control system as claimed in claim 4, wherein a shutoff valve is arranged inside the second flow path formed as a bypass to the first flow path having the supplemental refrigerant-air heat exchanger of the refrigeration circuit.

6. The climate control system as claimed in claim 1, wherein the first coolant-air heat exchanger is arranged inside a first flow path of the coolant circuit and the second coolant-air heat exchanger is arranged inside a second flow path of the coolant circuit, wherein the first flow path and the second flow path and the first coolant-air heat exchanger and the second coolant-air heat exchanger are arranged so that coolant can flow through them in parallel.

7. The climate control system as claimed in claim 1, wherein the coolant circuit is formed having a third coolant-air heat exchanger for transferring heat to air.

8. The climate control system as claimed in claim 7, wherein the third coolant-air heat exchanger is arranged inside a third flow path of the coolant circuit, which is arranged so that it can have coolant flow through it in parallel to the first flow path formed by the first coolant-air heat exchanger and/or the second flow path formed by the second coolant-air heat exchanger.

9. A climate control system of a motor vehicle comprising:
a refrigeration circuit; and
a coolant circuit, the refrigeration circuit further comprising:
  a compressor;
  a refrigerant-coolant heat exchanger operable as a condenser/gas cooler for heat exchange between a refrigerant and a coolant of the coolant circuit; and
  at least one first refrigerant-air heat exchanger for conditioning an intake air for a passenger compartment having a first expansion element arranged upstream in a flow direction of the refrigerant,
the coolant circuit further comprising:
  a first conveyor device; and
  at least one first coolant-air heat exchanger for heating the intake air for the passenger compartment and the first refrigerant-coolant heat exchanger, wherein the refrigeration circuit is formed having a supplemental refrigerant-air heat exchanger for exchanging heat between the refrigerant and ambient air, wherein the supplemental refrigerant-air heat exchanger of the refrigeration circuit is arranged downstream of the first refrigerant-coolant heat exchanger in the flow direction of the refrigerant and an expansion element is upstream of the supplemental refrigerant-air heat exchanger of the refrigeration circuit in the flow direction of the refrigerant, wherein the refrigeration circuit is formed having a second refrigerant-air heat exchanger for conditioning the intake air for the passenger compartment, wherein a second expansion element is upstream of the second refrigerant-air heat exchanger in the flow direction of the refrigerant, and the coolant circuit is formed having a second coolant-air heat exchanger for heating the intake air for the passenger compartment, wherein the first refrigerant-air heat exchanger of the refrigeration circuit and the first coolant-air heat exchanger of the coolant circuit are arranged inside a first component of an air conditioner and so the intake air for the passenger compartment can be applied to the first refrigerant-air heat exchanger of the refrigeration circuit and the first coolant-air heat exchanger of the coolant circuit in succession in a flow direction of the intake air, and wherein the second refrigerant-air heat exchanger of the refrigeration circuit and the second coolant-air heat exchanger of the coolant circuit are arranged inside a second component of the air conditioner, wherein the second refrigerant-air heat exchanger of the refrigeration circuit and the second coolant-air heat exchanger of the coolant circuit are arranged so air can be applied to them in succession inside the second component of the air conditioner in the flow direction of the air, and wherein the second component comprises a bypass for conducting air around the supplemental refrigerant-air heat exchanger of the refrigeration circuit, wherein an air guiding unit is formed for allocating an air mass flow over a heat exchange surface of the second refrigerant-air heat exchanger and through the bypass.

10. A climate control system of a motor vehicle comprising:
a refrigeration circuit; and a coolant circuit, the refrigeration circuit further comprising:
  a compressor;
  a refrigerant-coolant heat exchanger operable as a condenser/gas cooler for heat exchange between a refrigerant and a coolant of the coolant circuit; and
  at least one first refrigerant-air heat exchanger for conditioning an intake air for a passenger compartment having a first expansion element arranged upstream in a flow direction of the refrigerant,
the coolant circuit further comprising:
  a first conveyor device; and
  at least one first coolant-air heat exchanger for heating the intake air for the passenger compartment and the first refrigerant-coolant heat exchanger, wherein the refrigeration circuit is formed having a supplemental refrigerant-air heat exchanger for exchanging heat between the refrigerant and ambient air, wherein the supplemental refrigerant-air heat exchanger of the refrigeration circuit is arranged downstream of the first refrigerant-coolant heat exchanger in the flow direction of the refrigerant and an expansion element is upstream of the supplemental refrigerant-air heat exchanger of the refrigeration circuit in the flow direction of the refrigerant, wherein the refrigeration circuit is formed having a second refrigerant-air heat exchanger for conditioning the intake air for the passenger compartment, wherein a second expansion element is upstream of the second refrigerant-air heat exchanger in the flow direction of the refrigerant, and the coolant circuit is formed having a second coolant-air heat exchanger for heating the intake air for the passenger compartment, wherein the first refrigerant-air heat exchanger of the refrigeration circuit and the first coolant-air heat exchanger of the coolant circuit are arranged inside a first component of an air conditioner and so the intake air for the passenger compartment can be applied to the first refrigerant-air heat exchanger of the refrigeration circuit and the first coolant-air heat exchanger of the coolant circuit in succession in a flow direction of the intake air, and wherein the second refrigerant-air heat exchanger of the refrigeration circuit and the second coolant-air heat exchanger of the coolant circuit are arranged inside a second component of the air conditioner, wherein the second component of the air conditioner is formed from two elements arranged separately from one another, wherein the second coolant-air heat exchanger of the coolant circuit is arranged inside the first element of the second component and the second refrigerant-air heat exchanger of the refrigeration circuit is arranged inside the second element of the second component.

11. A climate control system of a motor vehicle comprising:
  a refrigeration circuit; and
  a coolant circuit, the refrigeration circuit further comprising:
    a compressor;
    a refrigerant-coolant heat exchanger operable as a condenser/gas cooler for heat exchange between a refrigerant and a coolant of the coolant circuit; and
    at least one first refrigerant-air heat exchanger for conditioning an intake air for a passenger compartment having a first expansion element arranged upstream in a flow direction of the refrigerant,
  the coolant circuit further comprising:
    a first conveyor device; and
    at least one first coolant-air heat exchanger for heating the intake air for the passenger compartment and the first refrigerant-coolant heat exchanger, wherein the refrigeration circuit is formed having a supplemental refrigerant-air heat exchanger for exchanging heat between the refrigerant and ambient air, wherein the supplemental refrigerant-air heat exchanger of the refrigeration circuit is arranged downstream of the first refrigerant-coolant heat exchanger in the flow direction of the refrigerant and an expansion element is upstream of the supplemental refrigerant-air heat exchanger of the refrigeration circuit in the flow direction of the refrigerant, wherein the refrigeration circuit is formed having a second refrigerant-air heat exchanger for conditioning the intake air for the passenger compartment, wherein a second expansion element is upstream of the second refrigerant-air heat exchanger in the flow direction of the refrigerant, and the coolant circuit is formed having a second coolant-air heat exchanger for heating the intake air for the passenger compartment, wherein the first expansion element and the first refrigerant-air heat exchanger are arranged inside a first flow path of the refrigeration circuit and the second expansion element and the second refrigerant-air heat exchanger arranged inside a second flow path of the refrigeration circuit, wherein the first flow path and the second flow path are arranged so the refrigerant can flow through them in parallel, wherein the refrigeration circuit comprises a third flow path having a third expansion element and a second refrigerant-coolant heat exchanger operable as an evaporator, wherein the third expansion element is upstream of the second refrigerant-coolant heat exchanger in the flow direction of the refrigerant and the third flow path is formed parallel to the first flow path and to the second flow path.

12. A climate control system of a motor vehicle comprising:
  a refrigeration circuit; and
  a coolant circuit, the refrigeration circuit further comprising:
    a compressor;
    a refrigerant-coolant heat exchanger operable as a condenser/gas cooler for heat exchange between a refrigerant and a coolant of the coolant circuit; and
    at least one first refrigerant-air heat exchanger for conditioning an intake air for a passenger compartment having a first expansion element arranged upstream in a flow direction of the refrigerant,
  the coolant circuit further comprising:
    a first conveyor device; and
    at least one first coolant-air heat exchanger for heating the intake air for the passenger compartment and the first refrigerant-coolant heat exchanger, wherein the refrigeration circuit is formed having a supplemental refrigerant-air heat exchanger for exchanging heat between the refrigerant and ambient air, wherein the supplemental refrigerant-air heat exchanger of the refrigeration circuit is arranged downstream of the first refrigerant-coolant heat exchanger in the flow direction of the refrigerant and an expansion element is upstream of the supplemental refrigerant-air heat exchanger of the refrigeration circuit in the flow direction of the refrigerant, wherein the refrigeration circuit is formed having a second refrigerant-air heat exchanger for conditioning the intake air for the passenger compartment, wherein a second expansion element is upstream of the second refrigerant-air heat exchanger in the flow direction of the refrigerant, and the coolant circuit is formed having a second coolant-air heat exchanger for heating the intake air for the passenger compartment, wherein the first expansion element and the first refrigerant-air heat exchanger are arranged inside a first flow path of the refrigeration circuit and the second expansion element and the second refrigerant-air heat exchanger arranged inside a second flow path of the refrigeration circuit, wherein the first flow path and the second flow path are arranged so the refrigerant can flow through them in parallel, wherein the refrigeration circuit comprises a third flow path having a third expansion element and a second refrigerant-coolant heat exchanger operable as an evaporator, wherein the third expansion element is upstream of the second refrigerant-coolant heat exchanger in the flow direction of the refrigerant and the third flow path is formed parallel to the first flow path and to the second flow path, wherein the first flow path having the first expansion element and the first refrigerant-air heat exchanger and the second flow path having the second expansion element and the second refrigerant-air heat exchanger are each formed extending from a first diversion point up to a first discharge point.

13. The climate control system as claimed in claim 12, wherein the third flow path having the third expansion element and the second refrigerant-coolant heat exchanger is formed extending from a second diversion point up to a second discharge point, wherein the second discharge point is formed downstream of the first discharge point in the flow direction of the refrigerant through the first flow path and the second flow path.

14. A climate control system of a motor vehicle comprising:
  a refrigeration circuit; and
  a coolant circuit, the refrigeration circuit further comprising:
    a compressor;
    a refrigerant-coolant heat exchanger operable as a condenser/gas cooler for heat exchange between a refrigerant and a coolant of the coolant circuit; and
    at least one first refrigerant-air heat exchanger for conditioning an intake air for a passenger compartment having a first expansion element arranged upstream in a flow direction of the refrigerant,
  the coolant circuit further comprising:
    a first conveyor device; and
    at least one first coolant-air heat exchanger for heating the intake air for the passenger compartment and the first refrigerant-coolant heat exchanger, wherein the refrigeration circuit is formed having a supplemental refrigerant-air heat exchanger for exchanging heat between the refrigerant and ambient air, wherein the supplemental refrigerant-air heat exchanger of the refrigeration circuit is arranged downstream of the first refrigerant-coolant heat exchanger in the flow direction of the refrigerant and an expansion element is upstream of the supplemental refrigerant-air heat exchanger of the refrigeration circuit in the flow direction of the refrigerant, wherein the refrigeration circuit is formed having a second refrigerant-air heat exchanger for conditioning the intake air for the passenger compartment, wherein a second expansion element is upstream of the second refrigerant-air heat exchanger in the flow direction of the refrigerant, and the coolant circuit is formed having a second coolant-air heat exchanger for heating the intake air for the passenger compartment, wherein the first expansion element and the first refrigerant-air heat exchanger are arranged inside a first flow path of the refrigeration circuit and the second expansion element and the second refrigerant-air heat exchanger arranged inside a second flow path of the refrigeration circuit, wherein the first flow path and the second flow path are arranged so the refrigerant can flow through them in parallel, wherein an expansion element is formed downstream of the second refrigerant-air heat exchanger inside the second flow path in the flow direction of the refrigerant.

15. A climate control system of a motor vehicle comprising:
  a refrigeration circuit; and
  a coolant circuit, the refrigeration circuit further comprising:
    a compressor;
    a refrigerant-coolant heat exchanger operable as a condenser/gas cooler for heat exchange between a refrigerant and a coolant of the coolant circuit; and
    at least one first refrigerant-air heat exchanger for conditioning an intake air for a passenger compartment having a first expansion element arranged upstream in a flow direction of the refrigerant,
  the coolant circuit further comprising:
    a first conveyor device; and
    at least one first coolant-air heat exchanger for heating the intake air for the passenger compartment and the first refrigerant-coolant heat exchanger, wherein the refrigeration circuit is formed having a supplemental refrigerant-air heat exchanger for exchanging heat between the refrigerant and ambient air, wherein the supplemental refrigerant-air heat exchanger of the refrigeration circuit is arranged downstream of the first refrigerant-coolant heat exchanger in the flow direction of the refrigerant and an expansion element is upstream of the supplemental refrigerant-air heat exchanger of the refrigeration circuit in the flow direction of the refrigerant, wherein the expansion element upstream of the supplemental refrigerant-air heat exchanger of the refrigeration circuit for exchanging heat between the refrigerant and the ambient air and the supplemental refrigerant-air heat exchanger of the refrigeration circuit are arranged inside a first flow path of the refrigeration circuit, and wherein a second flow path is formed as a bypass to the first flow path having the supplemental refrigerant-air heat exchanger of the refrigeration circuit, wherein the first flow path and the second flow path are each formed extending between a diversion point and a discharge point, wherein a shutoff valve is arranged inside the second flow path formed as a bypass to the first flow path having the supplemental refrigerant-air heat exchanger of the refrigeration circuit, wherein the refrigeration circuit comprises an internal heat exchanger formed inside the first flow path, wherein the internal heat exchanger is arranged on a high-pressure side before the first expansion element and on a low-pressure side after the first refrigerant-air heat exchanger in the flow direction of the refrigerant.

16. A climate control system of a motor vehicle comprising:
- a refrigeration circuit; and
- a coolant circuit, the refrigeration circuit further comprising:
  - a compressor;
  - a refrigerant-coolant heat exchanger operable as a condenser/gas cooler for heat exchange between a refrigerant and a coolant of the coolant circuit; and
  - at least one first refrigerant-air heat exchanger for conditioning an intake air for a passenger compartment having a first expansion element arranged upstream in a flow direction of the refrigerant,
- the coolant circuit further comprising:
  - a first conveyor device; and
  - at least one first coolant-air heat exchanger for heating the intake air for the passenger compartment and the first refrigerant-coolant heat exchanger, wherein the refrigeration circuit is formed having a supplemental refrigerant-air heat exchanger for exchanging heat between the refrigerant and ambient air, wherein the supplemental refrigerant-air heat exchanger of the refrigeration circuit is arranged downstream of the first refrigerant-coolant heat exchanger in the flow direction of the refrigerant and an expansion element is upstream of the supplemental refrigerant-air heat exchanger of the refrigeration circuit in the flow direction of the refrigerant, wherein the refrigeration circuit is formed having a second refrigerant-air heat exchanger for conditioning the intake air for the passenger compartment, wherein a second expansion element is upstream of the second refrigerant-air heat exchanger in the flow direction of the refrigerant, and the coolant circuit is formed having a second coolant-air heat exchanger for heating the intake air for the passenger compartment, wherein the first coolant-air heat exchanger is arranged inside a first flow path of the coolant circuit and the second coolant-air heat exchanger is arranged inside a second flow path of the coolant circuit, wherein the first flow path and the second flow path and the first coolant-air heat exchanger and the second coolant-air heat exchanger are arranged so that coolant can flow through them in parallel, wherein the coolant circuit comprises a third flow path, which is formed in parallel to the flow paths having the coolant-air heat exchangers, wherein the third flow path is formed having a second refrigerant-coolant heat exchanger operable as an evaporator and a second conveyor device.

17. A method for operating the climate control system of the motor vehicle having the refrigeration circuit and the coolant circuit for an operation in a refrigeration mode, in a heat pump mode, and in a reheating mode for the intake air of the passenger compartment to be conditioned as claimed in claim 1, wherein a pressure level of the refrigerant inside the supplemental refrigerant-air heat exchanger for exchanging heat between the refrigerant and the ambient air is continuously set depending on an operating mode between a high pressure level and a low pressure level of the refrigeration circuit using the expansion element upstream of the supplemental refrigerant-air heat exchanger in the flow direction of the refrigerant, so that the supplemental refrigerant-air heat exchanger is operated as a condenser/gas cooler and heat is transferred from the refrigerant to the ambient air at a temperature level of the refrigerant corresponding to a pressure level above a temperature of the ambient air, and the supplemental refrigerant-air heat exchanger is operated as an evaporator and heat is transferred from the ambient air to the refrigerant at a temperature level of the refrigerant corresponding to a pressure level below the temperature of the ambient air.

18. The method as claimed in claim 17 wherein the pressure level of the refrigerant is set in such a way that the pressure level inside the first refrigerant-air heat exchanger for conditioning the intake air for the passenger compartment and a pressure level inside a second refrigerant-air heat exchanger for conditioning the intake air for the passenger compartment correspond to one another or deviate from one another, and wherein at least one pressure level inside the first refrigerant-air heat exchanger and/or inside the second refrigerant-air heat exchanger corresponds to a pressure level inside a refrigerant-coolant heat exchanger operable as an evaporator or is higher than the pressure level inside the refrigerant-coolant heat exchanger operable as an evaporator.

19. The method as claimed in claim 18, wherein the first refrigerant-air heat exchanger and the second refrigerant-air heat exchanger have a refrigerant flow through them in parallel to one another.

20. The method as claimed in claim 18, wherein:
- air is applied to the second refrigerant-air heat exchanger and subsequently to a second coolant-air heat exchanger in a flow direction of the air, wherein in each case at least one partial air mass flow is conducted over a heat exchange surface of the second refrigerant-air heat exchanger and over a heat exchange surface of the second coolant-air heat exchanger and/or
- at least one partial air mass flow of an air mass flow conducted over the heat exchange surface of the second refrigerant-air heat exchanger or past the second refrigerant-air heat exchanger is discharged into the surroundings.

21. The method as claimed in claim 17, wherein the first coolant-air heat exchanger and a second coolant-air heat exchanger have coolant flow through them in parallel to one another or in series in succession.

* * * * *